(12) United States Patent
Kubota

(10) Patent No.: US 11,209,632 B2
(45) Date of Patent: Dec. 28, 2021

(54) PROJECTION OPTICAL SYSTEM AND IMAGE PROJECTION DEVICE

(71) Applicant: Ricoh Company, Ltd., Tokyo (JP)

(72) Inventor: Takashi Kubota, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/758,233

(22) PCT Filed: Oct. 24, 2018

(86) PCT No.: PCT/JP2018/039510
§ 371 (c)(1),
(2) Date: Apr. 22, 2020

(87) PCT Pub. No.: WO2019/082933
PCT Pub. Date: May 2, 2019

(65) Prior Publication Data
US 2020/0249448 A1   Aug. 6, 2020

(30) Foreign Application Priority Data

Oct. 27, 2017 (JP) .............................. JP2017-208481

(51) Int. Cl.
*G02B 13/16* (2006.01)
*G02B 9/00* (2006.01)
(Continued)

(52) U.S. Cl.
CPC .............. *G02B 13/16* (2013.01); *G02B 9/04* (2013.01); *G02B 9/12* (2013.01); *G02B 9/64* (2013.01);
(Continued)

(58) Field of Classification Search
None
See application file for complete search history.

(56) References Cited

U.S. PATENT DOCUMENTS

| 4,976,525 A | 12/1990 | Matsumura et al. |
| 2004/0027478 A1* | 2/2004 | Do .......................... G02B 13/18 348/363 |

(Continued)

FOREIGN PATENT DOCUMENTS

| JP | H02-257111 | 10/1990 |
| JP | H8-320433 A | 12/1996 |

(Continued)

OTHER PUBLICATIONS

International Search Report and Written Opinion dated Jan. 24, 2019 in PCT/JP2018/039510 filed Oct. 24, 2018.

(Continued)

*Primary Examiner* — Darryl J Collins
(74) *Attorney, Agent, or Firm* — Xsensus LLP

(57) ABSTRACT

According to an embodiment, a projection optical system for an image projection device, that includes a plurality of lenses. The projection optical system satisfies conditional expression (1): where fw is a focal length of a lens having the weakest refractive power in the lenses and f is a focal length of the whole projection optical system.

$$0.01 \leq \left|\frac{f}{f_w}\right| < 0.34 \qquad (1)$$

17 Claims, 7 Drawing Sheets

(51) Int. Cl.
  *G02B 15/14* (2006.01)
  *G02B 13/00* (2006.01)
  *G02B 9/12* (2006.01)
  *G02B 9/64* (2006.01)
  *G02B 9/04* (2006.01)

(52) U.S. Cl.
  CPC ....... *G02B 13/005* (2013.01); *G02B 15/1425* (2019.08)

(56) References Cited

U.S. PATENT DOCUMENTS

| | | |
|---|---|---|
| 2009/0109543 A1 | 4/2009 | Nagatoshi. |
| 2011/0199690 A1 | 8/2011 | Lee et al. |
| 2017/0168269 A1* | 6/2017 | Yasui .................. G02B 5/1842 |
| 2018/0299653 A1 | 10/2018 | Kubota et al. |

FOREIGN PATENT DOCUMENTS

| | | |
|---|---|---|
| JP | H11-500834 A | 1/1999 |
| JP | 2010-181653 | 8/2010 |
| JP | 2010-197599 | 9/2010 |
| JP | 2010-249946 | 11/2010 |
| JP | 2011-170309 | 9/2011 |
| JP | 2014-021309 | 2/2014 |
| JP | 2018-180238 | 11/2018 |

OTHER PUBLICATIONS

Office Action dated Sep. 21, 2021 in Japanese Patent Application No. 2017-208481, 4 pages.

\* cited by examiner

[Fig. 1]
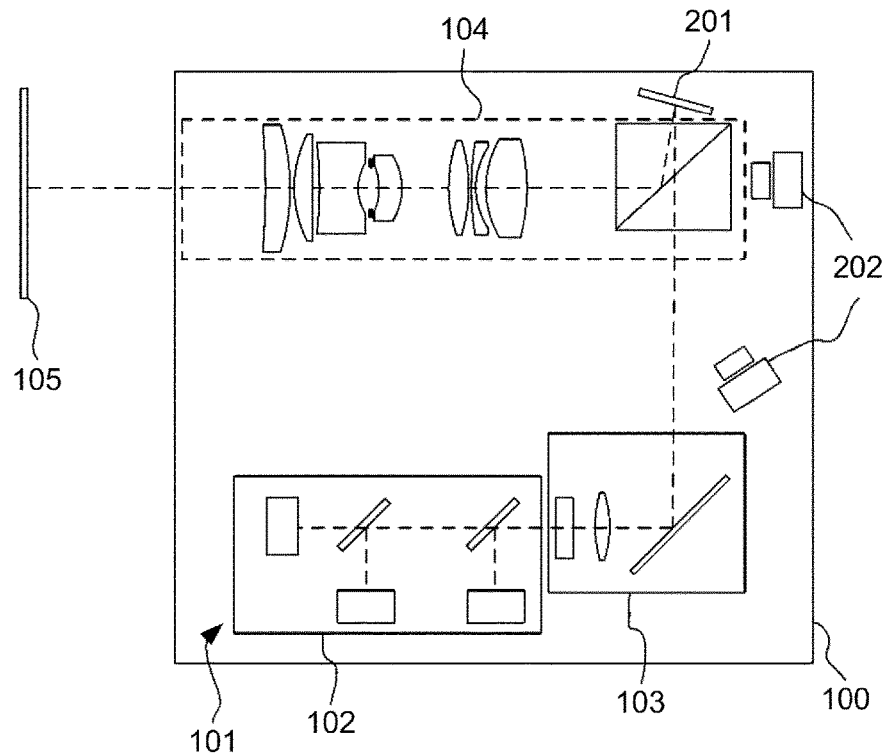
[Fig. 2]
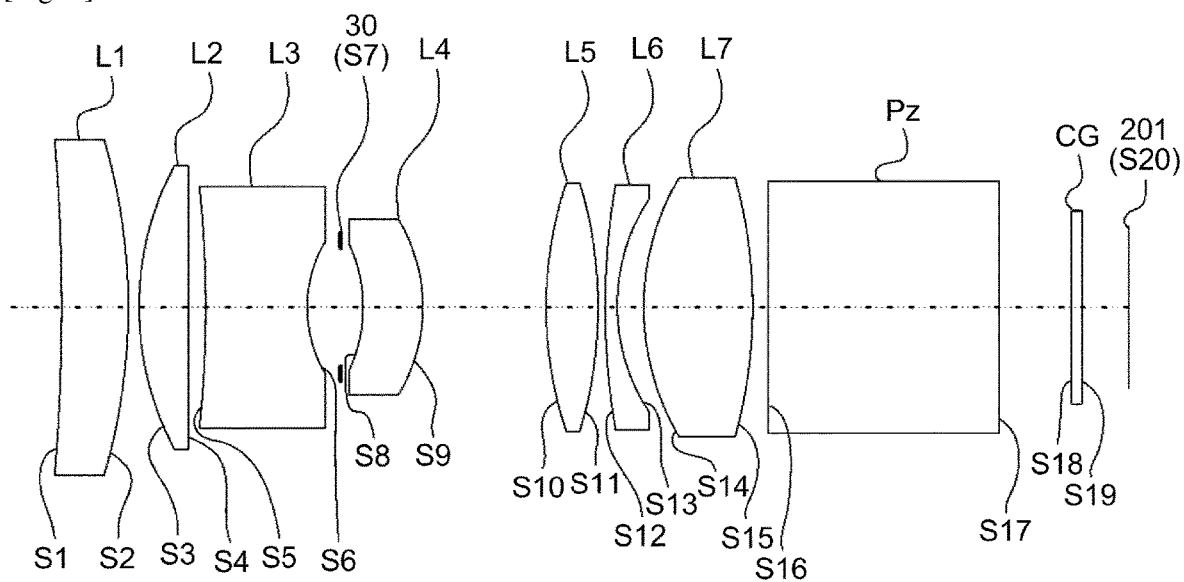

[Fig. 3]
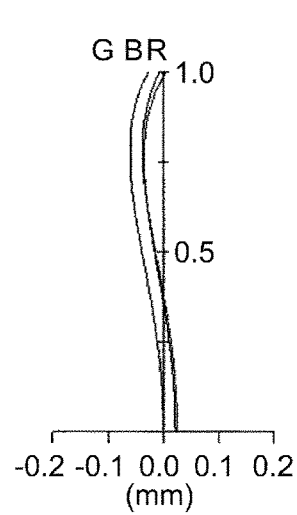
Spherical Aber.
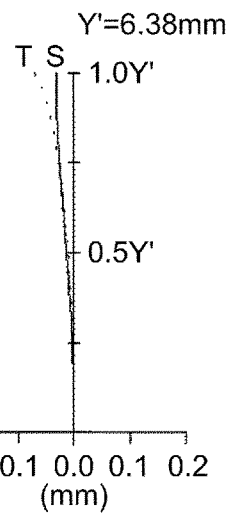
Astigmatic Field curves
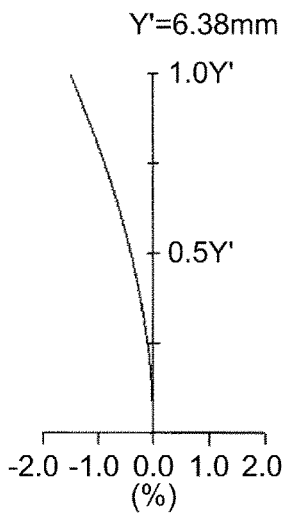
Distortion
[Fig. 4]
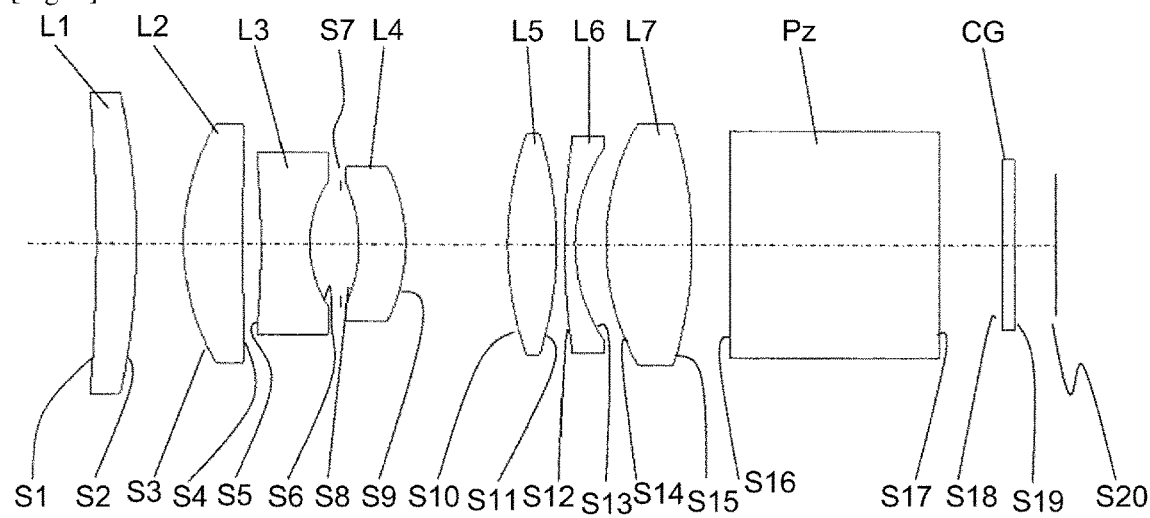
[Fig. 5]
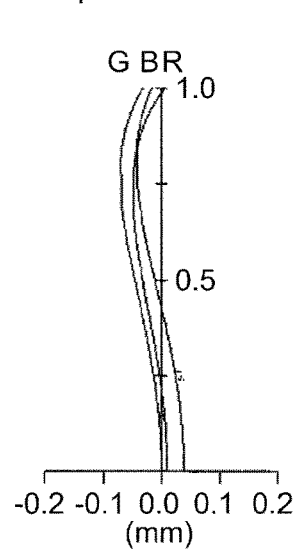
Spherical Aber.
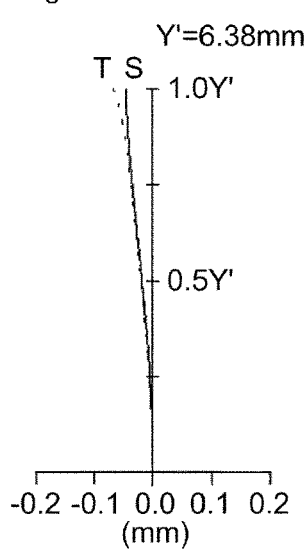
Astigmatic Field curves
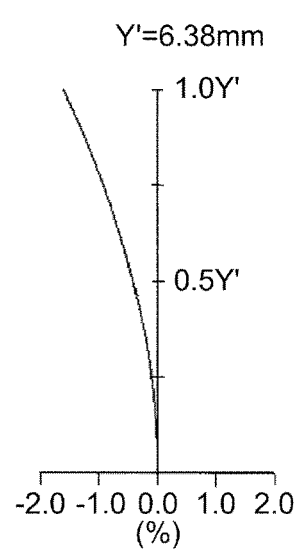
Distortion

[Fig. 6]
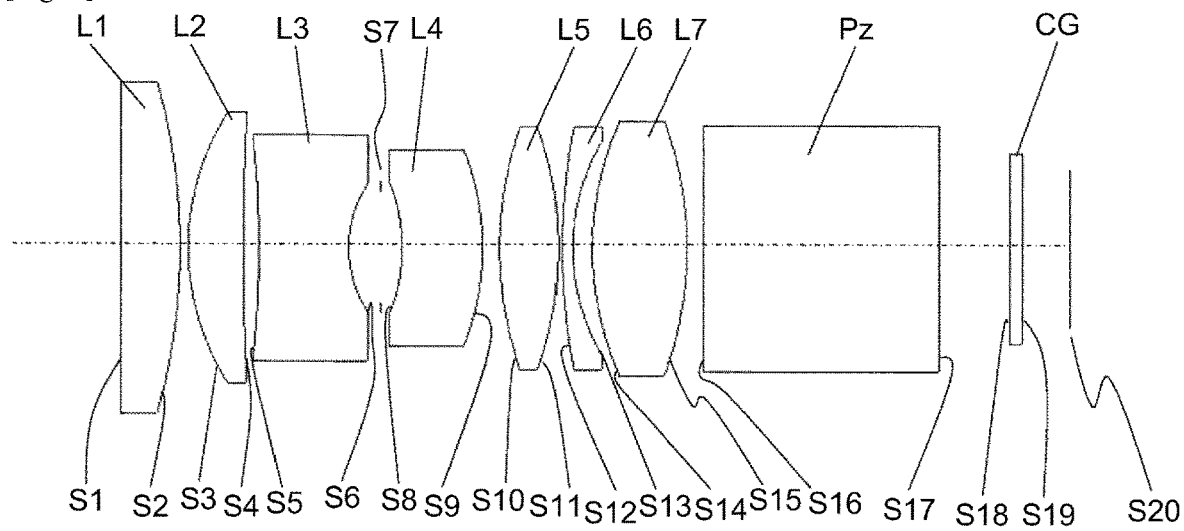
[Fig. 7]
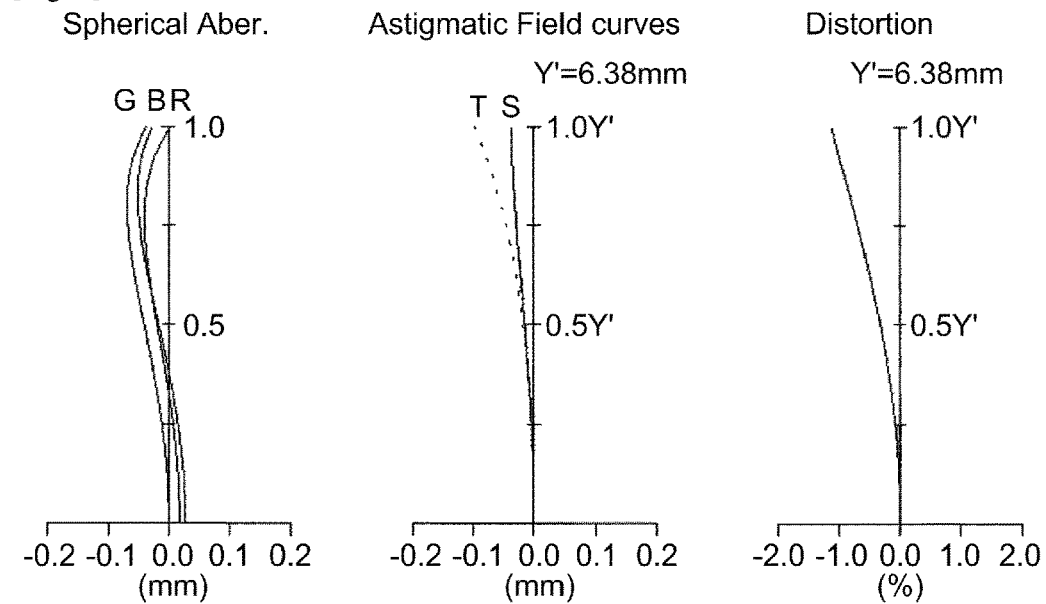
[Fig. 8]
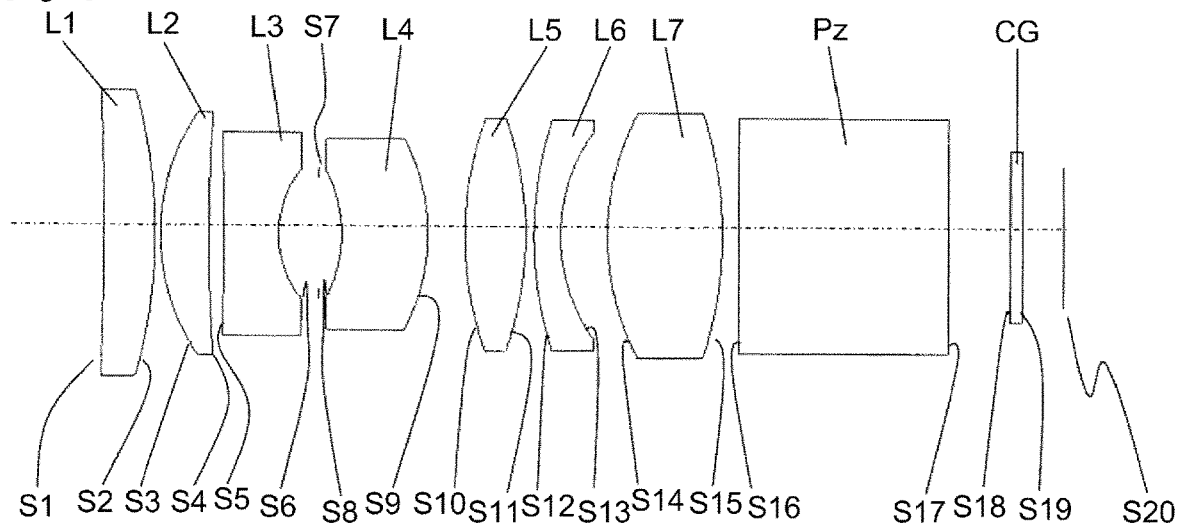

[Fig. 9]
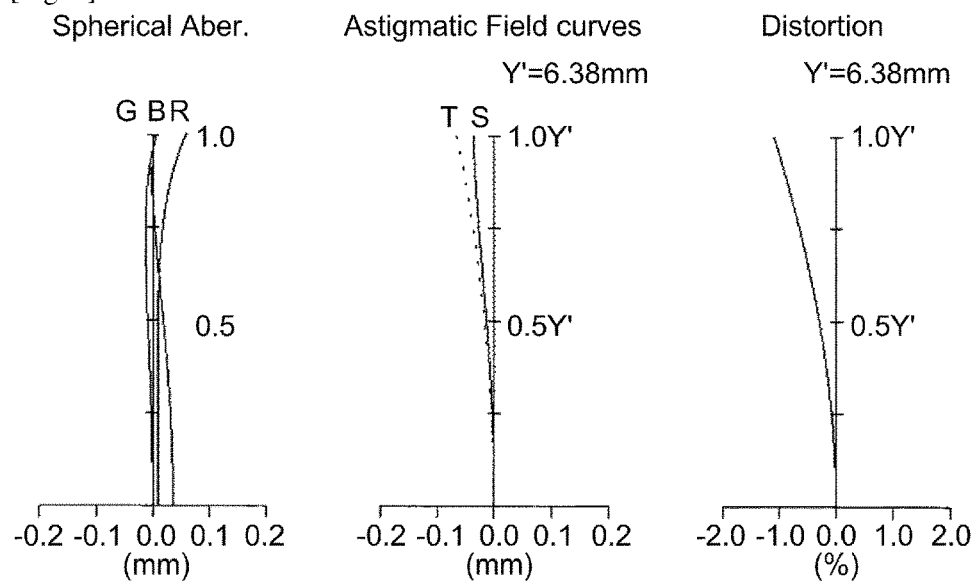
[Fig. 10]
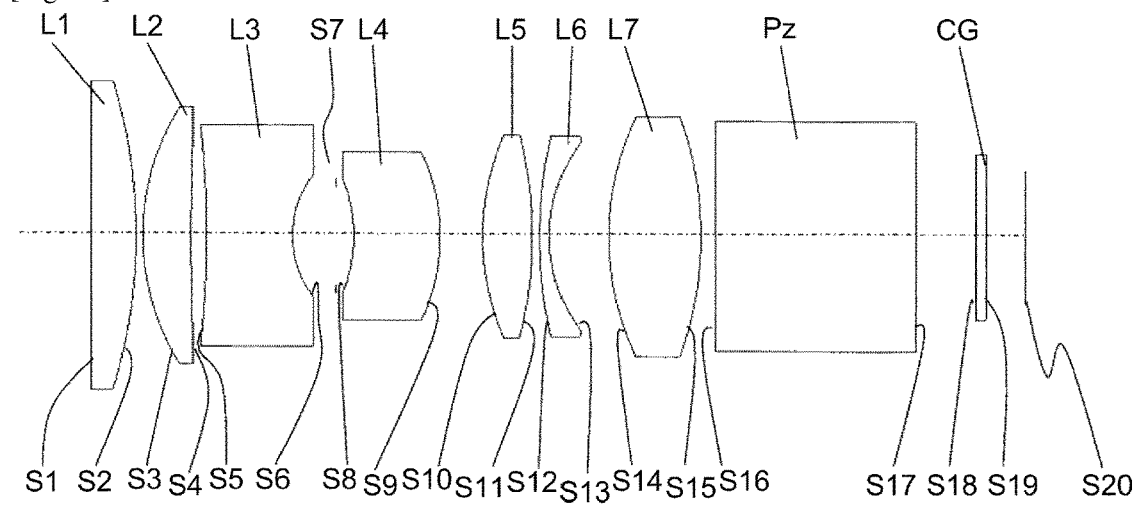
[Fig. 11]
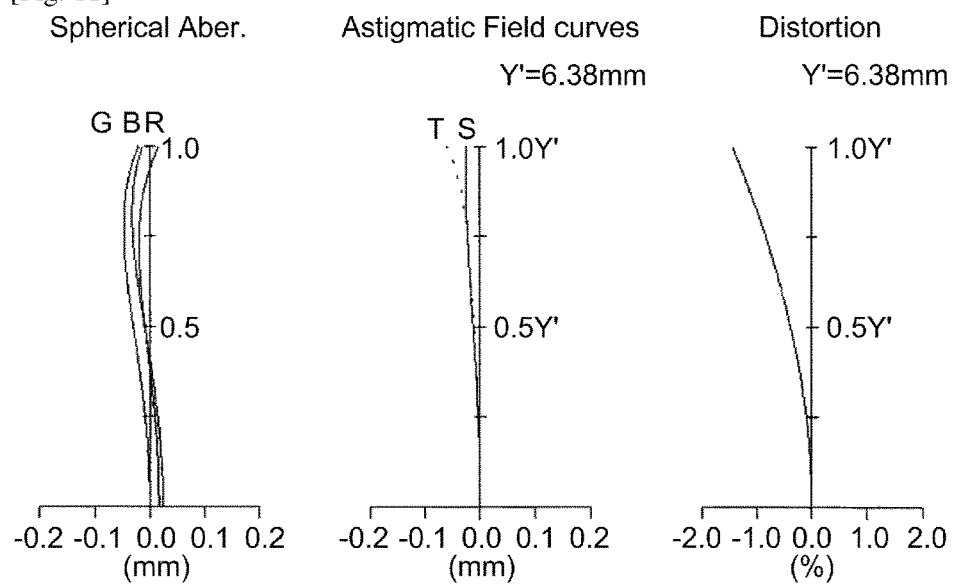

[Fig. 12]
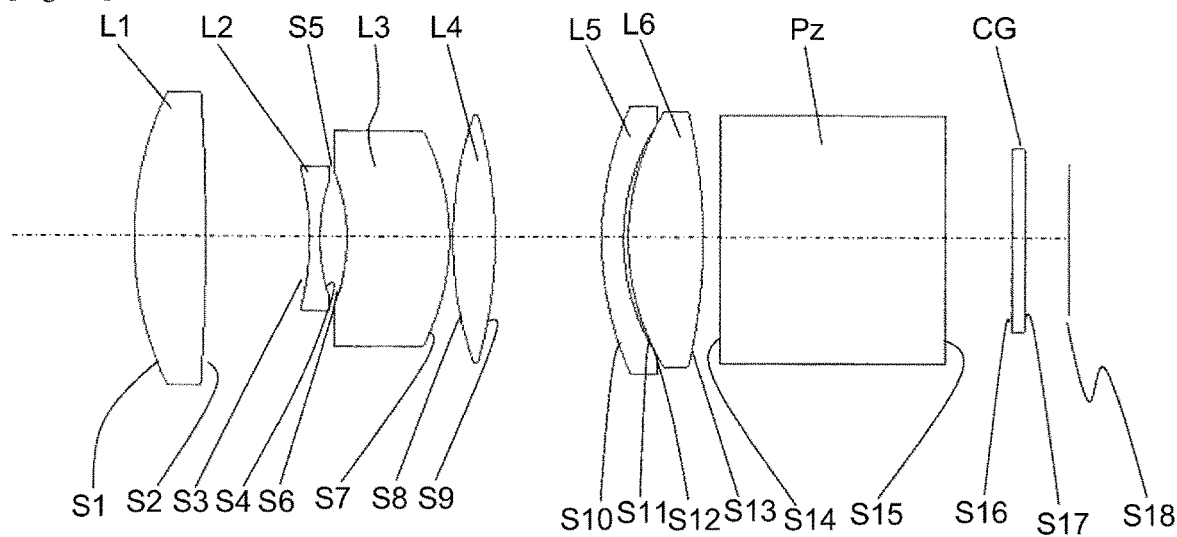
[Fig. 13]
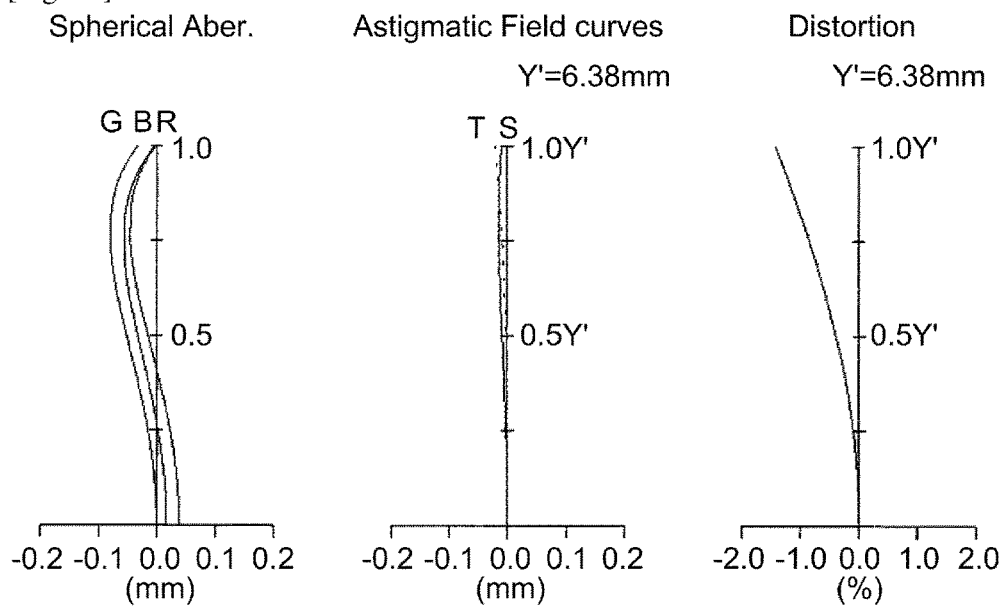
[Fig. 14]
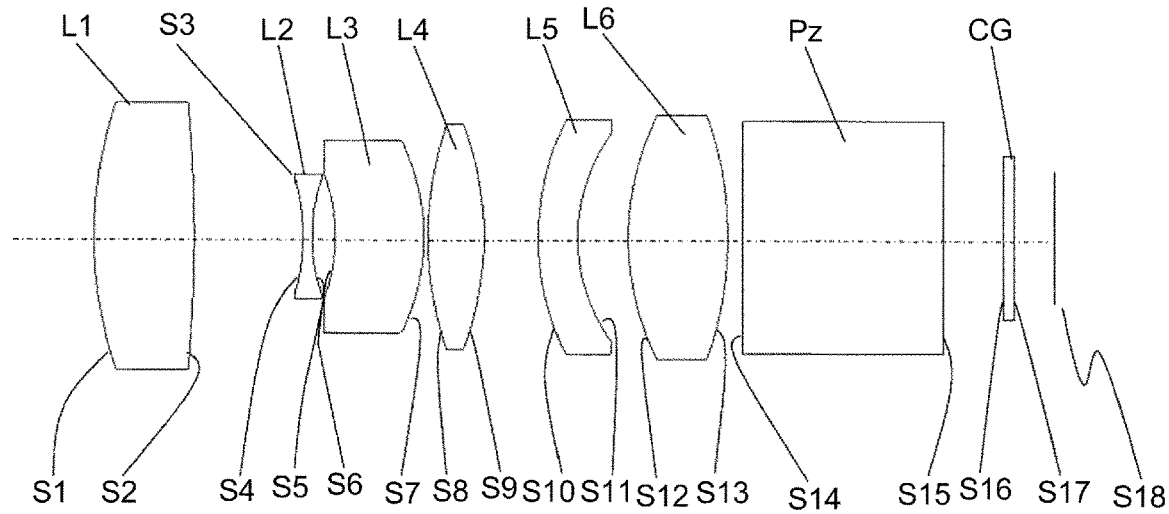

[Fig. 15]
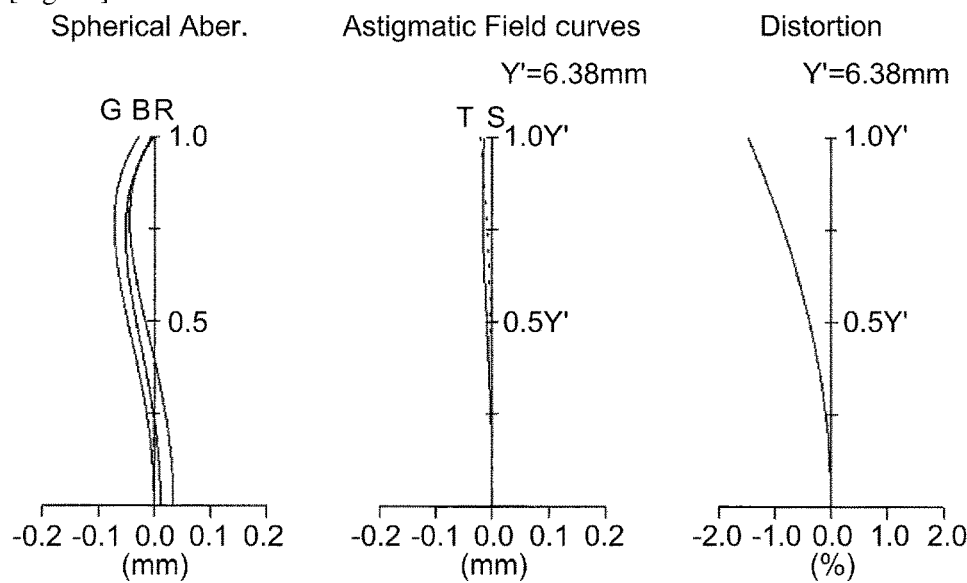
[Fig. 16]
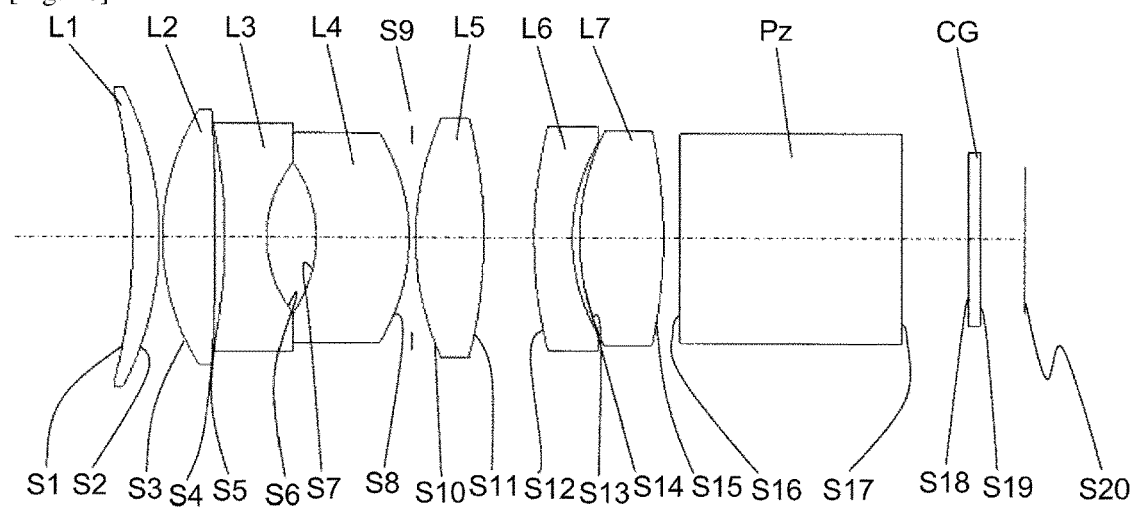
[Fig. 17]
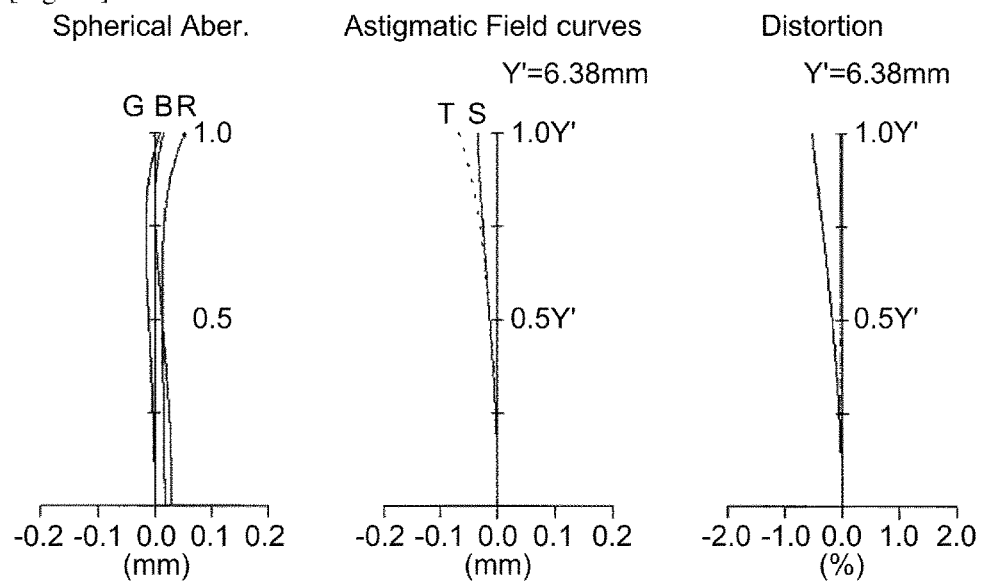

[Fig. 18]
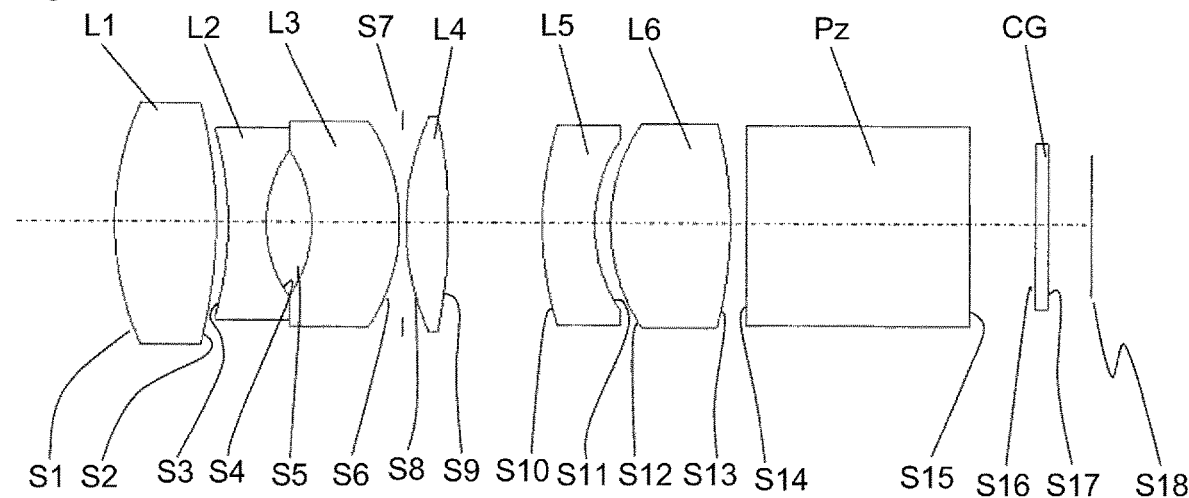
[Fig. 19]
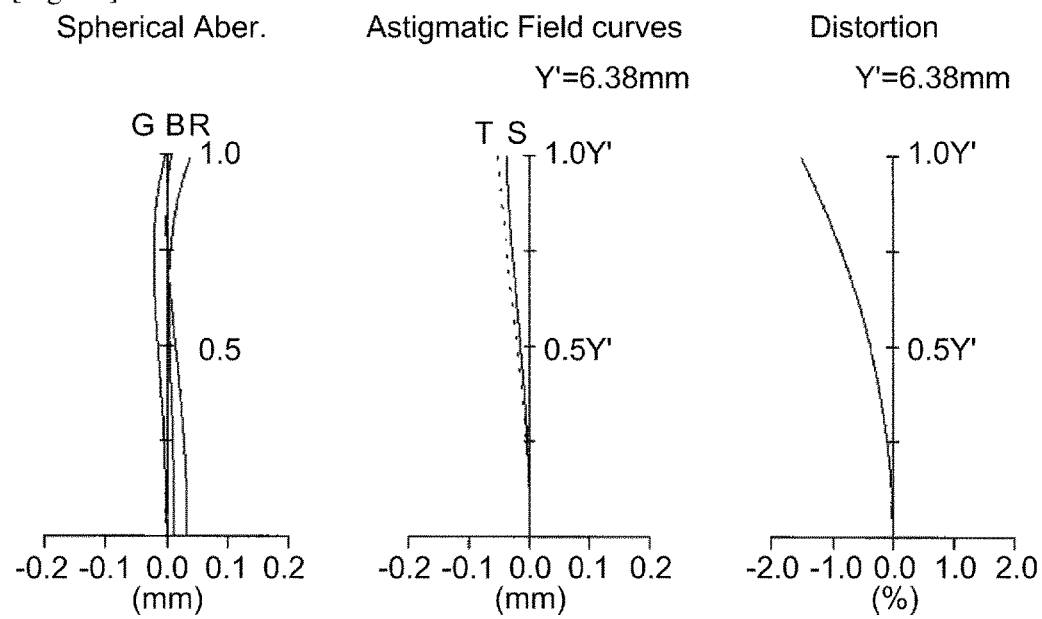

PROJECTION OPTICAL SYSTEM AND IMAGE PROJECTION DEVICE

TECHNICAL FIELD

The present invention relates to a projection optical system used for an image projection device.

BACKGROUND ART

Recently, a projection technique has diversified into various technical fields including not only a front projection projector but also a head-up display (HUD) mounted on a signage and a vehicle, and the market field thereof has been growing.

Except for a laser scanning projector, used image elements can be classified into a liquid crystal display element and a reflective display element (microelectromechanical system (MEMS) and digital light processing (DLP)). In any case, miniaturization, weight reduction, and high brightness have been progressing in recent years.

In such an image projection device, when a size is miniaturized, light quantity is locally condensed. Thus, a lens itself is required to have high light resistance and optical performance that is hardly changed upon temperature change, besides general performance demanded in an optical system such as aberration.

For achieving miniaturization of an optical system, there has been known a method for obtaining desirable optical performance and achieving miniaturization by applying an aspherical lens and a cemented lens to a lens forming the optical system (for example, refer to Patent Literature 1 to Patent Literature 6).

However, if a shape of a special lens surface such as an aspherical surface is selected, the shape of a special lens surface is sensitive to a minute manufacturing error and variation in operating conditions while optical characteristics are improved.

SUMMARY OF INVENTION

Technical Problem

In view of the foregoing, there is a need to provide a new projection optical system capable of reducing deterioration in performance caused by variation in conditions.

Solution to Problem

According to an embodiment, a projection optical system for an image projection device, that includes a plurality of lenses. The projection optical system satisfies conditional expression (1):

$$0.01 \leq \left| \frac{f}{f_w} \right| < 0.34 \qquad (1)$$

where fw is a focal length of a lens having the weakest refractive power in the lenses and f is a focal length of the whole projection optical system.

Advantageous Effects of Invention

A projection optical system of the embodiment can reduce deterioration in performance caused by variation in conditions while performing miniaturization.

BRIEF DESCRIPTION OF DRAWINGS

FIG. 1 is a schematic view illustrating the configuration of an image display device related to the present invention.

FIG. 2 is a cross-sectional view illustrating the configuration of a projection optical system in a first example.

FIG. 3 is a view illustrating aberration curves of the projection optical system in the first example.

FIG. 4 is a cross-sectional view illustrating the configuration of the projection optical system in a second example.

FIG. 5 is a view illustrating aberration curves of the projection optical system in the second example.

FIG. 6 is a cross-sectional view illustrating the configuration of the projection optical system in a third example.

FIG. 7 is a view illustrating aberration curves of the projection optical system in the third example.

FIG. 8 is a cross-sectional view illustrating the configuration of the projection optical system in a fourth example.

FIG. 9 is a view illustrating aberration curves of the projection optical system in the fourth example.

FIG. 10 is a cross-sectional view illustrating the configuration of the projection optical system in a fifth example.

FIG. 11 is a view illustrating aberration curves of the projection optical system in the fifth example.

FIG. 12 is a cross-sectional view illustrating the configuration of the projection optical system in a sixth example.

FIG. 13 is a view illustrating aberration curves of the projection optical system in the sixth example.

FIG. 14 is a cross-sectional view illustrating the configuration of the projection optical system in a seventh example.

FIG. 15 is a view illustrating aberration curves of the projection optical system in the seventh example.

FIG. 16 is a cross-sectional view illustrating the configuration of the projection optical system in an eighth example.

FIG. 17 is a view illustrating aberration curves of the projection optical system in the eighth example.

FIG. 18 is a cross-sectional view illustrating the configuration of the projection optical system in a ninth example.

FIG. 19 is a view illustrating aberration curves of the projection optical system in the ninth example. The accompanying drawings are intended to depict exemplary embodiments of the present invention and should not be interpreted to limit the scope thereof. Identical or similar reference numerals designate identical or similar components throughout the various drawings.

DESCRIPTION OF EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

The following describes embodiments of a projection optical system for an image projection device and the image projection device according to the present invention, with reference to the accompanying drawings.

First Embodiment

The following describes a projection optical system according to an embodiment of the present invention.

In the present embodiment, an image projection device 100 includes a lighting optical system 101 for uniformly emitting light from a light source 102, a projection optical system 104, and an image display element 201 serving as a light modulation element as illustrated in FIG. 1.

A broken line in FIG. 1 represents an optical axis. In the image projection device 100, description of configuration that is not much associated with the present invention is omitted as appropriate, but the image projection device 100 functions as an image projection device by mounting a power source, a cooling device, signal processing, and the like, and inputting an external signal.

By attaching a magnification and reduction optical system as a reflecting mirror such as a folding mirror and an attachment, the image projection device 100 becomes an image projection device applicable and developable to a head-up display (HUD) and the like. For example, the image projection device 100 can be mounted on a vehicle, a motorbike, and an airplane.

The lighting optical system 101 includes the light source 102 and a relay optical system 103.

The light source 102 is a red-green-blue (RGB) light source of a light-emitting diode (LED) in the present embodiment.

A light ray from the light source 102 is combined with the RGB light source through a folding mirror and a dichroic mirror, and enters the relay optical system 103.

In the present embodiment, the light source 102 is an RGB light source, but this is not limiting. The light source 102 may be a halogen lamp and a laser light source.

The relay optical system 103 includes a fly eye lens, a condenser lens, a field lens, and a folding mirror.

A light ray from the light source 102 has an RGB light source unevenness made uniform in the relay optical system 103. After that, the light ray from the light source 102 passes through a prism and is emitted to the image display element 201. In this configuration, the lighting optical system 101 can uniformly irradiate the image display element 201 with light from the light source 102. The image display element 201 is a reflective image display element in FIG. 1, but may be a transmissive image display element depending on a layout.

When the lighting optical system 101 emits light of three RGB colors, the image display element 201 is controlled in order to respond to an individual element at a timing when each color is emitted, and reflected light from the image display element 201 is magnified by the projection optical system 104 and is projected and displayed as an image on a screen 105 that is a projected surface.

The image projection device 100 may automatically control the emitted light quantity and color by arranging light quantity detecting elements 202, a microcomputer, and the like in addition to the configuration described above.

An image projection device generally includes a collimator lens of a lighting optical system, a field lens, and the like, and needs to secure relatively a large arrangement place.

Due to the space of the projection optical system 104 and the lighting optical system 101 in the image projection device 100, a back focus of the projection optical system 104 needs to be secured to a certain extent, and a lens diameter on the image display element 201 side needs to be reduced.

Conventionally, for making a lens diameter smaller, there has been known a method for obtaining desirable optical performance and achieving miniaturization by using an aspherical lens and a cemented lens.

By contrast, when applied to especially an on-vehicle HUD and the like, the image projection device 100 may be arranged on a part close to outside air and a heat source such as the vicinity of a front glass and a front side of a vehicle. Thus, it is preferable that the image projection device 100 reduce deterioration in performance caused by a temperature change as much as possible.

However, when a shape of a lens surface of an aspherical surface lens, a cemented lens, and the like is selected, the shape of a lens surface is sensitive to a minute manufacturing error and variation in temperature change while optical characteristics are improved.

Conversely, when a projection optical system is formed using simply a spherical single lens, it is hard to correct aberration and difficult to perform miniaturization as compared with a case where a cemented lens and an aspherical lens are used.

In the present embodiment, by using the projection optical system 104 that satisfies conditions, which will be described later, a change in optical performance upon temperature change can be reduced while high performance and light resistance are secured.

The projection optical system 104 is a projection optical system suitable for an image projection device (projector device) in which reflective image display element such as a digital micromirror device (DMD) is used as a light modulation element. The projection optical system 104 includes a plurality of lenses L1 to L7 as illustrated in FIG. 2.

FIG. 2 is a view illustrating the optical arrangement of the projection optical system 104 corresponding to a first numerical value example, which will be described later.

The projection optical system 104 is a projection optical system that is formed of the lenses L1 to L7 from a magnification side (left side in FIG. 2) in order. An aperture stop 30 is disposed between the lenses L3 and L4, and a prism Pz is disposed on a reduction side of the lens L7.

The prism Pz has a function of bending an optical path, and returns a light ray including image information from the image display element 201 at the prism Pz so as to inject the light ray from the projection optical system 104.

A cross prism, a total internal reflection (TIR) prism, a reverse total internal reflection (RTIR) prism, and the like may be used as the prism Pz, and the prism Pz is selectable depending on the kinds and characteristics of the image display element 201.

The following describes each surface number of optical members including the aperture stop 30 in the projection optical system 104 as S1 to S20 from a magnification side in order.

A cover glass CG and the image display element 201 that is a light modulation element are arranged on a reduction side (right side in FIG. 2) than the prism Pz. The same arrangement applies to each numerical value examples described with reference to FIGS. 3 to 19.

Out of the lenses L1 to L7 forming the projection optical system 104, a "lens having the weakest refractive power" is the lens L4 in the present embodiment.

the projection optical system 104 satisfies Conditional Expression (1) where fw is a focal length of the lens L4 and f is a focal length of the whole projection optical system 104.

$$0.01 \leq \left|\frac{f}{f_w}\right| < 0.34 \qquad (1)$$

Conditional Expression (1) represents the ratio of a focal length of a "lens having the weakest refractive power" to a focal length of the whole projection optical system 104.

When the ratio is lower than a lower limit, refractive power of the lens L4 is too weak against the whole lens system. Thus, it is difficult to correct aberration of the projection optical system 104, and desirable optical performance is unlikely to be satisfied. This is unsatisfactory.

When the ratio is higher than an upper limit, refractive power of the lens L4 is too strong against the whole lens system. Thus, chromatic aberration is not sufficiently corrected, and it is difficult to perform sufficient miniaturization.

In the present embodiment, by satisfying Conditional Expression (1), deterioration in performance caused by variation in conditions can be reduced while miniaturization is performed.

In the projection optical system 104 in the present embodiment, a lens group formed by adding the lenses L1, L2, and L3 together is defined as a magnification side lens group G1. In other words, the magnification side lens group G1 is a "lens group arranged on a magnification side with respect to the lens L4 having the weakest refractive power".

A lens group formed by adding the magnification side lens group G1 and the "lens L4 having the weakest refractive power" is defined as a "lens group from the lens L1 on the most magnification side to the lens L4 having the weakest refractive power".

Similarly, a lens group formed by adding the lenses L5, L6, and L7 together is defined as a reduction side lens group G2. In other words, the reduction side lens group G2 is a "lens group on a reduction side with respect to the lens L4 having the weakest refractive power".

In FIG. 2, each of the lenses L1 to L7 forming the projection optical system 104 is a single lens having a spherical surface.

The "single lens" indicates that the lens is not a cemented lens.

This configuration reduces distortion of a cemented part caused by a temperature change, thereby reducing deterioration in optical performance caused by a temperature change of the projection optical system 104.

In the projection optical system 104 according to the present embodiment, the whole lenses forming the projection optical system 104 are made of glass, and each has a spherical shape.

In this configuration, formation with single lenses improves light resistance, and using only spherical lenses reduces a performance change in a change in surface shape upon temperature change.

In the projection optical system 104 according to the present embodiment, the lens L4 that is the "lens having the weakest refractive power in the whole lens systems" has a concave shape on a magnification side and a convex shape on a reduction side in a projection optical system for an image projection device.

This configuration can provide a projection optical system that has a wide angle and high performance while controlling aberration correction in an appropriate range.

In the present embodiment, the total refractive power of the lens group from the lens L1 on the most magnification side to the lens L4 having the weakest refractive power is negative. The refractive power of the reduction side lens group G2 on a reduction side with respect to the lens L4 having the weakest refractive power is positive. This configuration can achieve a projection optical system that has a wide angle and high performance.

By arranging the lens L4 having the weakest refractive power between the magnification side lens group G1 having negative refractive power and the reduction side lens group G2 having positive refractive power, and forming the lens L4 into a concave shape on a magnification side and into a convex shape on a reduction side, aberration can be corrected with higher performance.

In the present embodiment, the projection optical system 104 satisfies Conditional Expression (2) where fw is a focal length of the lens L4 having the weakest refractive power.

$$\frac{1}{|f_w|} < 1.3 \times 10^{-2} \qquad (2)$$

When a result value is outside a range of Conditional Expression (2), refractive power of the lens L4 that is the "lens having the weakest refractive power" is too strong. Thus, optical performance is secured in the environment of around a room temperature ranging about 0° C. to 60° C., but spherical aberration is larger in the environment where a temperature is greatly changed ranging about −40° C. to 110° C., and the larger spherical aberration becomes an occurrence factor of field curvature. This is not preferable.

By limiting refractive power of the lens L4 that is the "lens having the weakest refractive power" in a range where the projection optical system 104 satisfies Conditional Expression (2), aberration can be appropriately corrected under an environment where a temperature is greatly changed as well as room temperature.

In the present embodiment, the projection optical system 104 satisfies Conditional Expression (3) where fw is a focal length of the lens L4 and Tw is a lens thickness of the same lens L4.

$$\frac{T_w}{|f_w|} < 8.0 \times 10^{-2} \qquad (3)$$

When a result value is equal to or higher than an upper limit of Conditional Expression (3), the lens thickness is too thick. Thus, balance between refractive power and aberration is lost, and it is difficult to exhibit sufficient performance.

By setting a lens thickness and a focal length of the lens L4 in a range of Conditional Expression (3), the projection optical system 104 serves as a projection optical system that has high performance while reducing a change in optical performance under the environment where a temperature is greatly changed.

In the present embodiment, the projection optical system 104 satisfies Conditional Expression (4) where Rw is a curvature radius of the lens L4 on a magnification side and fw is a focal length of the lens L4.

$$\left|\frac{R_w}{f_w}\right| < 1.6 \times 10^{-1} \quad (4)$$

When a result value is equal to or higher than an upper limit of Conditional Expression (4), the curvature radius Rw or refractive power of the lens L4 is too large. Thus, balance between refractive power and aberration correction is lost, and it is difficult to exhibit sufficient performance.

By setting a curvature radius on a magnification side and a focal length of the lens L4 in a range of Conditional Expression (4), the projection optical system 104 serves as a projection optical system that has high performance while reducing a change in optical performance under the environment where a temperature is greatly changed.

In the present embodiment, it is preferable that the projection optical system 104 satisfy Conditional Expression (5) where FX is a composite focal length between the magnification side lens group G1 including the lens L4 and being disposed on a magnification side with respect to the lens L4 and the lens L4 having the weakest refractive power, and FY is a focal length of the reduction side lens group G2 disposed on a reduction side with respect to the lens L4.

$$2.0 < \left|\frac{FX}{FY}\right| < 8.5 \quad (5)$$

This Conditional Expression (5) indicates balance of power between a magnification side and a reduction side of the projection optical system 104 that is seen centering on the lens L4. When a result value is outside a range of Conditional Expression (5), refractive power distribution of the magnification side lens group G1 and the reduction side lens group G2 is not balanced, thereby affecting optical performance. This is not preferable.

In this configuration, the focal length FX is a "composite focal length from the lens L1 on the most magnification side to the lens L4 having the weakest refractive power".

In the present embodiment, the lens L3 having the most negative refractive power out of the lenses L1 to L7 is arranged on a magnification side of the lens L4 having the weakest refractive power.

In this configuration, the projection optical system 104 sufficiently corrects aberration and reduces eccentric sensitivity low.

Without depending on this configuration, if a lens having larger positive refractive power is arranged on a reduction side of the lens L3 having larger negative refractive power, aberration is sufficiently corrected, however eccentric sensitivity between the lenses is higher, and high accuracy is required in manufacturing. This is not preferable.

In the present embodiment, the projection optical system 104 is formed of a plurality of single lenses, and the lenses L1 to L3 on a magnification side with respect to the aperture stop 30 have negative refractive power as a whole and the lenses L4 to L7 on a reduction side with respect to the aperture stop 30 have positive refractive power as a whole.

In any one of the lens groups on a magnification side and a reduction side with respect to the aperture stop 30, the lens L4 having the weakest refractive power in the projection optical system 104 is arranged, and has a concave shape on the magnification side and has a convex shape on the reduction side.

This configuration reduces a change in aberration when an ambient light ray passes upon temperature change.

Only the numerical value examples in which the total number of lenses is six or seven are described, however it is preferable that the projection optical system 104 be formed of a maximum of nine lenses, by taking into consideration manufacturing errors.

In the present embodiment, it is preferable that the projection optical system 104 satisfy Conditional Expression (6) where FF is a composite focal length of a lens group on a magnification side with respect to the aperture stop 30, that is, the lenses L1 to L3.

$$\frac{1}{FF} < 2.5 \times 10^{-2} \quad (6)$$

When a result value is equal to or higher than an upper limit of Conditional Expression (6), eccentric sensitivity of a lens group is higher and accuracy required in manufacturing is higher. This is not preferable.

By satisfying Conditional Expression (6), eccentric sensitivity of a lens group is kept low and deterioration in optical performance can be reduced even when eccentricity is generated within a manufacturing error range.

In the present embodiment, it is preferable that the projection optical system 104 satisfy Conditional Expression (7) where FF is a composite focal length of a lens group on a magnification side with respect to the aperture stop 30, that is, the lenses L1 to L3 and FR is a composite focal length of a lens group on a reduction side with respect to the aperture stop 30, that is, the lenses L4 to L7.

$$1.5 < \left|\frac{FF}{FR}\right| < 21.0 \quad (7)$$

When the projection optical system 104 is considered as an optical system formed of two groups that are a magnification side and a reduction side divided centering on the aperture stop 30, this Conditional Expression (7) indicates a ratio of refractive power between the magnification side and the reduction side.

When a result value is outside a range of the Conditional Expression (7), eccentric sensitivity is likely to be high and aberration variation caused by eccentricity is large. This is not preferable.

By setting a ratio of refractive power at both sides of the aperture stop 30 in order to satisfy Conditional Expression (7), eccentric sensitivity can be reduced while the projection optical system 104 can keep favorable aberration correction. Thus, aberration variation is reduced so as to contribute to improvement in yield even when eccentricity is generated around the aperture stop 30.

In the present embodiment, it is preferable that the projection optical system 104 satisfy Conditional Expression (8) where OAL is a lens overall length, which is a physical distance from a surface S1 on a magnification side of the lens L1 arranged on the most magnification side in the optical members having refractive power to a surface S15 on a reduction side of the lens L7 arranged on the most reduction side, out of the optical members forming the projection optical system 104, and f is a focal length of the whole system of the projection optical system 104.

$$1.0 < \frac{OAL}{f} < 3.0 \qquad (8)$$

By satisfying Conditional Expression (8), aberration can be appropriately corrected while the focal length f of the whole lens system and the lens overall length OAL are kept in an appropriate range and miniaturization of the projection optical system 104 is achieved.

In the present embodiment, it is preferable that the projection optical system 104 satisfy the Conditional Expression (9) where $LP\alpha(\times 10^{-7}/°C.)$ is a linear expansion coefficient of the lens L1 on the most magnification side in a use range of 100° C. to 300° C.

$$LP\alpha < 100 \qquad (9)$$

A lens exposed to the most severe temperature change in the projection optical system 104 is the lens L1 arranged on a magnification side that is easily affected by external air. In addition, in the general projection optical system, a diameter of a lens on the most magnification side is often enlarged.

Thus, it is preferable that an optical material satisfying Conditional Expression (9) be used for at least lens L1.

Using a glass material satisfying Conditional Expression (9) reduces distortion caused by a temperature change of a lens and a change in optical characteristics under an environment where a temperature change is extremely severe. Thus, deterioration in performance caused by variation in conditions can be reduced while miniaturization is performed.

In the present embodiment, the image projection device 100 extends the whole projection optical system 104 in an optical axis direction so as to perform focus adjustment.

This configuration reduces deterioration in optical performance caused by a change in projection distance most appropriately, but the configuration is not limiting. For example, focus may be adjusted by separating the lenses L1 to L7 into a predetermined number of lens groups and making each of the lens groups operate independently.

There may be used a system in which only a part of lenses in the projection optical system 104 is moved by focus adjustment methods such as a front focus system, an inner focus system, and a rear focus system.

The following describes specific numerical value examples and aberration views of each lens configuration corresponding to the embodiment described above.

In the following numerical value examples, the projection optical system 104 satisfies any of Conditional Expressions (1) to (9).

Signs in each example are as follows:
f: focal length in the whole optical system
Fno: the number of apertures
ω: half angle of view
R: curvature radius
D: surface separation
Nd: refractive index
vd: Abbe number
L: lens
F: focal length of a lens
fG: focal length for a lens group First Numerical Value Example FIG. 2 is a view illustrating the optical arrangement of the projection optical system according to a first example. The projection optical system 104 is formed of the lenses L1 to L7 from a magnification side (left side in FIG. 2) in order. The aperture stop 30 is disposed between the lenses L3 and L4, and the prism Pz is disposed on a reduction side of the lens L7.

The light modulation element is arranged at the end S20 on a reduction side (right side in FIG. 2). The cover glass CG of the light modulation element is arranged on a surface facing the prism Pz.

When putting a focus as described earlier, the projection optical system 104 according to the first example can adjust a focus by simultaneously moving the whole lens system L1 to L7 as a unit, but this is not limiting.

The lenses L1 to L3 are arranged on a magnification side with respect to the aperture stop 30, and the total refractive power of the lenses L1 to L3 is negative. From the most magnification side in order, the projection optical system 104 is formed of the positive meniscus lens L1 having a concave surface on the magnification side, the positive meniscus lens L2 having a convex surface on the magnification side, and the biconcave negative lens L3.

The lenses L4 to L7 are arranged on a reduction side with respect to the aperture stop 30, and the total refractive power of the lenses L4 to L7 is positive. From the most magnification side in order, the projection optical system 104 is formed of the positive meniscus lens L4 having a concave surface on the magnification side and a convex surface on a reduction side, the biconvex positive lens L5, the negative meniscus lens L6 having a convex surface on the magnification side, and the biconvex positive lens L7.

A lens having the weakest refractive power in the whole lens system is the lens L4 having a concave surface on a magnification side and a convex surface on a reduction side. The lens L3 having the strongest refractive power in the whole lens system is arranged on a magnification side of the lens L4. The total refractive power of the lenses L1 to L4 having the weakest refractive power is negative, and the total refractive power of the lenses L5 to L7 is positive.

A reduction side of the lens L7 is formed of the prism Pz, the cover glass (CG) for an image display element, and the image display element surface (S20). The prism Pz serves to bend an optical path, and can return image information from the image display element 201 at the prism Pz so as to inject the image information from the projection optical system. Examples of the prism Pz include a cross prism, a TIR prism, and an RTIR prism, and any display element can be disposed depending on the kind of the display element.

All of the lenses L1 to L7 have a spherical surface, and are formed of a lens single body and have no cemented lens.

FIG. 3 illustrates an aberration view of the projection optical system according to the first example, and illustrates spherical aberration (Spherical Aber. (SA)), astigmatic aberration (Astigmatic Field curves (AS)), and distortion aberration (Distortion) from the left side in order. In the SA, a sign R indicates spherical aberration of red (wavelength is 625 nm), a sign G indicates spherical aberration of green (wavelength is 550 nm), and a sign B indicates spherical aberration of blue (wavelength is 460 nm). In the AS, a sign S illustrates astigmatic aberration of a sagittal field, and a sign T illustrates astigmatic aberration of a tangential field. As illustrated in FIG. 3, aberration correction exhibits a favorable condition.

Regarding description of the aberration view, detailed description is omitted because like signs are assigned in a second example to a ninth example.

Table 1 lists each numerical value of the first example. S indicates a surface number (the same applies hereinafter).

TABLE 1 f = 31.3 mm, Fno = 2.2, ω = 11.6°

| S | R | D | Nd | vd | L | F | fG |
|---|---|---|---|---|---|---|---|
| 1 | −117.14 | 5.70 | 1.75700 | 47.82 | L1 | 89.8 | −141.7 FX |
| 2 | −44.165 | 0.70 | | | | | −181.3 |
| 3 | 23.414 | 4.30 | 1.80100 | 34.97 | L2 | 29.8 | |
| 4 | 721.8 | 1.50 | | | | | |
| 5 | −68.832 | 8.77 | 1.69895 | 30.13 | L3 | −12.3 | |
| 6 | 10.518 | 2.98 | | | | | |
| 7 | INF | 1.79 | | | Stop | | |
| 8 | −11.963 | 5.13 | 1.80400 | 46.58 | L4 | 1728.3 | 20.6 |
| 9 | −14.14 | 10.40 | | | | | |
| 10 | 28.305 | 4.57 | 1.59522 | 67.74 | L5 | 27.3 | FY |
| 11 | −36.328 | 0.70 | | | | | 24.7 |
| 12 | 62.7 | 1.00 | 1.74950 | 35.28 | L6 | −27.0 | |
| 13 | 15.327 | 2.32 | | | | | |
| 14 | 20.1 | 9.20 | 1.59522 | 67.74 | L7 | 23.7 | |
| 15 | −40.068 | 1.40 | | | | | |
| 16 | INF | 20.00 | 1.58913 | 61.14 | Pz | — | — |
| 17 | INF | 6.00 | | | | | |
| 18 | INF | 1.10 | 1.51823 | 58.90 | CG | — | — |
| 19 | INF | 3.95 | | | | | |
| 20 | INF | | | | | | |

Table 1 lists a lens interval when a projection distance is 303 mm. "INF" in Table 1 represents infinity, and numerical values related to Conditional Expressions (1) to (9) described above are listed in Table 2. E represents E of exponent notation, and indicates the power of ten.

TABLE 2

| Conditional Expression | | Numerical Value |
|---|---|---|
| | fw | 1728.3 |
| (1) | \|f/fw\| | 1.8E−02 |
| (2) | 1/\|fw\| | 5.8E−04 |
| | Tw | 5.13 |
| (3) | Tw/\|fw\| | 3.0E−03 |
| | Rw | −11.963 |
| (4) | \|Rw/fw\| | 6.9E−03 |
| | FX | −181.3 |
| | FY | 24.7 |
| (5) | \|FX/FY\| | 7.35 |
| | FF | −141.73 |
| (6) | 1/\|FF\| | 7.1E−03 |
| | FR | 20.62 |
| (7) | \|FF/FR\| | 6.87 |
| | OAL | 59.06 |
| | F | 31.3 |
| (8) | OAL/f | 1.9 |
| (9) | LPα | 69 |

Second Numerical Value Example

FIG. 4 is a view illustrating the optical arrangement of the projection optical system according to a second example. The projection optical system 104 is formed of the lenses L1 to L7 from a magnification side (left side in FIG. 4) in order. The aperture stop is arranged between the lenses L3 and L4, and the prism Pz is disposed on a reduction side of the lens L7. The light modulation element is arranged at the S20 on a reduction side (right side in FIG. 4). The cover glass (CG) of the light modulation element is arranged on a surface facing the lens L7 of the light modulation element.

When putting a focus, the projection optical system 104 according to the second example can adjust a focus by simultaneously moving the whole lens system L1 to L7 as a unit.

The lenses L1 to L3 are arranged on a magnification side with respect to the aperture stop 30, and the total refractive power of the lenses L1 to L3 is negative. From the most magnification side in order, the projection optical system 104 is formed of the positive meniscus lens L1 having a concave surface on the magnification side, the positive meniscus lens L2 having a convex surface on the magnification side, and the biconcave negative lens L3.

The lenses L4 to L7 are arranged on a reduction side with respect to the aperture stop, and the total refractive power of the lenses L4 to L7 is positive. From the most magnification side in order, the projection optical system 104 is formed of the negative meniscus lens L4 having a concave surface on a magnification side, the biconvex positive meniscus lens L5, the negative meniscus lens L6 having a convex surface on the magnification side, and the biconvex positive lens L7.

A lens having the weakest refractive power in the whole lens system is the lens L4 having a concave surface on a magnification side and a convex surface on a reduction side. The lens L3 having the strongest refractive power in the whole lens system is arranged on a magnification side of the lens L4. The total refractive power of the lens L1 on the most magnification side to the lens L4 having the weakest refractive power is negative, and the total refractive power of the lenses L5 to L7 is positive.

All of the lenses L1 to L7 have a spherical surface, and are formed of a lens single body and have no cemented lens.

FIG. 5 illustrates an aberration view: spherical aberration, astigmatic aberration, and distortion aberration of the projection optical system according to the second example. Each aberration correction exhibits a favorable condition.

Table 3 lists each numerical value of the second example.

TABLE 3 f = 31.3 mm, Fno = 2.2, ω = 11.6°

| S | R | D | Nd | vd | L | F | fG |
|---|---|---|---|---|---|---|---|
| 1 | −152.25 | 3.85 | 1.75700 | 47.82 | L1 | 130.9 | −111.6 FX |
| 2 | −60.998 | 4.50 | | | | | −114.3 |
| 3 | 20.628 | 5.68 | 1.80100 | 34.97 | L2 | 26.8 | |
| 4 | 366.91 | 1.72 | | | | | |
| 5 | −85.305 | 4.61 | 1.69895 | 30.13 | L3 | −12.3 | |
| 6 | 9.892 | 2.96 | | | | | |
| 7 | INF | 1.75 | | | | | |
| 8 | −12.971 | 4.50 | 1.80400 | 46.58 | L4 | −719.7 | 21.0 |
| 9 | −15.327 | 9.80 | | | | | |
| 10 | 29.171 | 4.70 | 1.59522 | 67.74 | L5 | 26.3 | FY |
| 11 | −32.14 | 0.70 | | | | | 24.0 |
| 12 | 65.122 | 1.00 | 1.74950 | 35.28 | L6 | −26.6 | |
| 13 | 15.29 | 2.97 | | | | | |
| 14 | 21.553 | 8.23 | 1.59522 | 67.74 | L7 | 23.4 | |
| 15 | −34.247 | 3.69 | | | | | |
| 16 | INF | 20.00 | 1.58913 | 61.14 | Pz | — | — — |
| 17 | INF | 6.00 | | | | | |
| 18 | INF | 1.10 | 1.51823 | 58.90 | CG | — | — — |
| 19 | INF | 3.95 | | | | | |
| 20 | INF | | | | | | |

The interval described in Table 3 is a lens interval when a projection distance is 303 mm. Numerical values related to Conditional Expressions (1) to (9) described above are listed in Table 4.

TABLE 4

| | Conditional Expression | Numerical Value |
|---|---|---|
| | fw | −719.7 |
| (1) | |f/fw| | 4.4E−02 |
| (2) | 1/|fw| | 1.4E−03 |
| | Tw | 4.5 |
| (3) | Tw/|fw| | 6.3E−03 |
| | Rw | −12.971 |
| (4) | |Rw/fw| | 1.8E−02 |
| | FX | −114.3 |
| | FY | 24.0 |
| (5) | |FX/FY| | 4.76 |
| | FF | −111.64 |
| (6) | 1/|FF| | 9.0E−03 |
| | FR | 20.98 |
| (7) | |FF/FR| | 5.32 |
| | OAL | 56.97 |
| | F | 31.3 |
| (8) | OAL/f | 1.8 |
| (9) | LPα | 69 |

Third Numerical Value Example

FIG. 6 is a view illustrating the optical arrangement of the projection optical system 104 according to a third example. The projection optical system 104 is formed of the lenses L1 to L7 from a magnification side (left side in FIG. 6) in order. The aperture stop 30 is disposed between the lenses L3 and L4, and the prism Pz is disposed on a reduction side of the lens L7. The light modulation element is arranged at the S20 on a reduction side (right side in FIG. 6). The cover glass (CG) of the light modulation element is arranged on a surface facing the lens.

When putting a focus, the projection optical system 104 according to the third example can adjust a focus by simultaneously moving the whole lens system L1 to L7 as a unit.

The lenses L1 to L3 are arranged on a magnification side with respect to the aperture stop 30, and the total refractive power of the lenses L1 to L3 is negative. From the most magnification side in order, the projection optical system 104 is formed of the positive meniscus lens L1 having a concave surface on the magnification side, the positive meniscus lens L2 having a convex surface on the magnification side, and the biconcave negative lens L3.

The lenses L4 to L7 are arranged on a reduction side with respect to the aperture stop 30, and the total refractive power of the lenses L4 to L7 is positive. From the most magnification side in order, the projection optical system 104 is formed of the negative meniscus lens L4 having a concave surface on the magnification side, the biconvex positive lens L5, the negative meniscus lens L6 having a convex surface on the magnification side, and the biconvex positive lens L7.

A lens having the weakest refractive power in the whole lens system is the lens L4 having a concave surface on a magnification side and a convex surface on a reduction side. The lens L3 having the strongest refractive power in the whole lens system is arranged on the magnification side of the lens L4. The total refractive power of the lens L1 to the lens L4 having the weakest refractive power is negative, and the total refractive power of the lenses L5 to L7 is positive.

All of the lenses L1 to L7 have a spherical surface, and are formed of a lens single body and have no cemented lens.

FIG. 7 illustrates an aberration view: spherical aberration, astigmatic aberration, and distortion aberration of the projection optical system according to the third example. Each aberration correction exhibits a favorable condition.

Table 5 lists each numerical value of the third example.

TABLE 5 f = 30.3 mm, Fno = 2.2, ω = 11.6°

| S | R | D | Nd | vd | L | F | fG |
|---|---|---|---|---|---|---|---|
| 1 | −2027 | 5.00 | 1.65100 | 56.16 | L1 | 73.8 | −132.1 FX |
| 2 | −47.351 | 0.70 | | | | | −73.5 |
| 3 | 19.491 | 4.72 | 1.71700 | 47.93 | L2 | 29.6 | |
| 4 | 196.54 | 1.33 | | | | | |
| 5 | −79.515 | 7.58 | 1.70154 | 41.24 | L3 | −11.1 | |
| 6 | 9.101 | 2.74 | | | | | |
| 7 | INF | 1.80 | | | | | |
| 8 | −13.63 | 6.84 | 1.80400 | 39.59 | L4 | −90.2 | 18.2 |
| 9 | −20.509 | 1.45 | | | | | |
| 10 | 28.4 | 5.00 | 1.59522 | 67.74 | L5 | 24.5 | FY |

TABLE 5-continued f = 30.3 mm, Fno = 2.2, ω = 11.6°

| S | R | D | Nd | vd | L | F | fG |
|---|---|---|---|---|---|---|---|
| 11 | −28.4 | 0.30 | | | | | 19.8 |
| 12 | 49.136 | 0.90 | 1.71736 | 29.52 | L6 | −34.2 | |
| 13 | 16.381 | 1.68 | | | | | |
| 14 | 24.371 | 8.06 | 1.59522 | 67.74 | L7 | 23.2 | |
| 15 | −28.474 | 1.39 | | | | | |
| 16 | INF | 20.00 | 1.58913 | 61.14 | Pz | — | — |
| 17 | INF | 6.00 | | | | | |
| 18 | INF | 1.10 | 1.51823 | 58.90 | CG | — | — |
| 19 | INF | 3.95 | | | | | |
| 20 | INF | | | | | | |

Table 5 lists a lens interval when a projection distance is 303 mm. Numerical values related to Conditional Expressions (1) to (9) are listed in Table 6.

TABLE 6

| Conditional Expression | | Numerical Value |
|---|---|---|
| | fw | −90.2 |
| (1) | \|f/fw\| | 3.36E−01 |
| (2) | 1/\|fw\| | 1.1E−02 |
| | Tw | 6.84 |
| (3) | Tw/\|fw\| | 7.6E−02 |
| | Rw | −13.63 |
| (4) | \|Rw/fw\| | 1.5E−01 |
| | FX | −73.5 |
| | FY | 19.8 |
| (5) | \|FX/FY\| | 3.7 |
| | FF | −132.06 |
| (6) | 1/\|FF\| | 7.6E−03 |
| | FR | 18.20 |
| (7) | \|FF/FR\| | 7.26 |
| | OAL | 48.10 |
| | F | 30.3 |
| (8) | OAL/f | 1.6 |
| (9) | LPα | 83 |

Fourth Numerical Value Example

FIG. 8 is a view illustrating the optical arrangement of the projection optical system according to a fourth example. The projection optical system is formed of the lenses L1 to L7 from a magnification side (left side in FIG. 8) in order. The aperture stop 30 is disposed between the lenses L3 and L4, and the prism Pz is disposed on a reduction side of the lens L7. The light modulation element is arranged at the S20 on a reduction side (right side in FIG. 8). The cover glass CG of the light modulation element is arranged on a surface facing the lens.

When putting a focus, the projection optical system 104 according to the fourth example can adjust a focus by simultaneously moving the whole lens system L1 to L7 as a unit.

The lenses L1 to L3 are arranged on a magnification side with respect to the aperture stop 30, and the total refractive power of the lenses L1 to L3 is negative.

From the most magnification side in order, the lenses L1 to L3 are formed of the positive meniscus lens L1 having a concave surface on the magnification side, the positive meniscus lens L2 having a convex surface on the magnification side, and the biconcave negative lens L3.

The lenses L4 to L7 are arranged on a reduction side with respect to the aperture stop 30, and the total refractive power of the lenses L4 to L7 is positive. From the most magnification side in order, the projection optical system 104 is formed of the negative meniscus lens L4 having a concave surface on the magnification side, the biconvex positive lens L5, the negative meniscus lens L6 having a convex surface on the magnification side, and the biconvex positive lens L7.

A lens having the weakest refractive power in the whole lens system of the projection optical system 104 is the lens L4 having a concave surface on a magnification side and a convex surface on a reduction side. The lens L3 having the strongest refractive power in the whole lens system is arranged on the magnification side of the lens L4. The total refractive power of the lens L1 to the lens L4 having the weakest refractive power is negative, and the total refractive power of the lenses L5 to L7 is positive.

A reduction side of the lens L7 is formed of the prism Pz, the cover glass for a display element, and an image display element surface (S20). The prism Pz serves to bend an optical path, and can return image information from the display element at the prism Pz so as to inject the image information from the projection optical system. Examples of the prism Pz include a cross prism, a TIR prism, and an RTIR prism, and any display element can be disposed depending on the kind of the display element.

All of the lenses L1 to L7 have a spherical surface, and are formed of a lens single body and have no cemented lens.

FIG. 9 illustrates an aberration view: spherical aberration, astigmatic aberration, and distortion aberration of the projection optical system according to the fourth example. Each aberration correction exhibits a favorable condition.

Table 7 lists each numerical value of the fourth example.

TABLE 7 f = 32.3 mm, Fno = 2.2, ω = 11.1°

| S | R | D | Nd | vd | L | F | fG |
|---|---|---|---|---|---|---|---|
| 1 | −286.53 | 4.90 | 1.51633 | 64.14 | L1 | 103.9 | −456.3 FX |
| 2 | −45.705 | 0.50 | | | | | −127.0 |
| 3 | 19.15 | 4.60 | 1.71700 | 47.93 | L2 | 30.3 | |
| 4 | 136.16 | 1.48 | | | | | |
| 5 | −210 | 5.16 | 1.57501 | 41.51 | L3 | −15.1 | |
| 6 | 9.225 | 3.81 | | | | | |
| 7 | INF | 2.23 | | | | | |
| 8 | −11.9 | 8.24 | 1.80610 | 40.93 | L4 | −112.8 | 22.0 |
| 9 | −17.92 | 3.56 | | | | | |
| 10 | 30.15 | 5.82 | 1.49700 | 81.55 | L5 | 31.2 | FY |
| 11 | −30.15 | 0.79 | | | | | 26.4 |
| 12 | 33.64 | 2.45 | 1.71736 | 29.52 | L6 | −43.5 | |
| 13 | 15.799 | 4.48 | | | | | |
| 14 | 23.414 | 11.00 | 1.49700 | 81.55 | L7 | 29.8 | |
| 15 | −34.36 | 1.48 | | | | | |
| 16 | INF | 20.00 | 1.58913 | 61.14 | Pz | — | — |
| 17 | INF | 6.00 | | | | | |
| 18 | INF | 1.10 | 1.51823 | 58.90 | CG | — | — |
| 19 | INF | 3.95 | | | | | |
| 20 | INF | | | | | | |

Table 7 lists a lens interval when a projection distance is 303 mm. Numerical values related to Conditional Expressions described above are listed in Table 8.

TABLE 8

| Conditional Expression | | Numerical Value |
|---|---|---|
| | fw | −112.8 |
| (1) | \|f/fw\| | 2.87E−01 |
| (2) | 1/\|fw\| | 8.9E−03 |
| | Tw | 8.24 |
| (3) | Tw/\|fw\| | 7.3E−02 |
| | Rw | −11.9 |

TABLE 8-continued

| Conditional Expression | | Numerical Value |
|---|---|---|
| (4) | \|Rw/fw\| | 1.1E-01 |
| | FX | -127.0 |
| | FY | 26.4 |
| (5) | \|FX/FY\| | 4.82 |
| | FF | -456.26 |
| (6) | 1/\|FF\| | 2.2E-03 |
| | FR | 22.03 |
| (7) | \|FF/FR\| | 20.71 |
| | OAL | 59.0 |
| | F | 32.32 |
| (8) | OAL/f | 1.8 |
| (9) | LPα | 86 |

Fifth Numerical Value Example

FIG. 10 is a view illustrating the optical arrangement of the projection optical system 104 according to a fifth example. The projection optical system 104 is formed of the lenses L1 to L7 from a magnification side (left side in FIG. 10) in order. The aperture stop 30 is disposed between the lenses L3 and L4, and the prism Pz is disposed on a reduction side of the lens L7. The light modulation element is arranged at the S20 on a reduction side (right side in FIG. 10). The cover glass CG of the light modulation element is arranged on a surface facing the lens.

When putting a focus, the projection optical system 104 according to the fifth example can adjust a focus by simultaneously moving the whole lens system L1 to L7 as a unit.

The lenses L1 to L3 are arranged on a magnification side with respect to the aperture stop 30, and the total refractive power of the lenses L1 to L3 is negative. From the most magnification side in order, the projection optical system 104 is formed of the positive meniscus lens L1 having a concave surface on the magnification side, the positive meniscus lens L2 having a convex surface on the magnification side, and the biconcave negative lens L3.

The lenses L4 to L7 are arranged on a reduction side with respect to the aperture stop 30, and the total refractive power of the lenses L4 to L7 is positive. From the most magnification side in order, the projection optical system 104 is formed of the negative meniscus lens L4 having a concave surface on the magnification side, the biconvex positive lens L5, the negative meniscus lens L6 having a convex surface on the magnification side, and the biconvex positive lens L7.

A lens having the weakest refractive power in the whole lens system is the lens L4 having a concave surface on a magnification side and a convex surface on a reduction side. The lens L3 having the strongest refractive power in the whole lens system is arranged on the magnification side of the lens L4. The total refractive power of the lens L1 to the lens L4 having the weakest refractive power is negative, and the total refractive power of the lenses L5 to L7 is positive.

All of the lenses L1 to L7 have a spherical surface, and are formed of a lens single body and have no cemented lens.

FIG. 11 illustrates an aberration view: spherical aberration, astigmatic aberration, and distortion aberration of the projection optical system 104 according to the fifth example. Each aberration correction exhibits a favorable condition.

Table 9 lists each numerical value of the fifth example.

TABLE 9 f = 31.8 mm, Fno = 2.2, ω = 11.4°

| S | R | D | Nd | vd | L | F | fG | |
|---|---|---|---|---|---|---|---|---|
| 1 | -3950 | 4.50 | 1.51742 | 52.43 | L1 | 94.7 | -216.5 | FX |
| 2 | -48.797 | 0.70 | | | | | | -205.7 |
| 3 | 22.6 | 4.80 | 1.71700 | 47.93 | L2 | 34.2 | | |
| 4 | 239.2 | 1.54 | | | | | | |
| 5 | -94.369 | 8.59 | 1.57501 | 41.51 | L3 | -14.1 | | |
| 6 | 9.241 | 4.44 | | | | | | |
| 7 | INF | 1.70 | | | | | | |
| 8 | -13.789 | 8.69 | 1.80440 | 39.59 | L4 | -532.0 | 20.4 | |
| 9 | -18.268 | 4.23 | | | | | | |
| 10 | 23.198 | 5.00 | 1.49700 | 81.55 | L5 | 29.5 | | FY |
| 11 | -37.5 | 0.70 | | | | | | 25.8 |
| 12 | 39.889 | 1.00 | 1.71736 | 29.52 | L6 | -32.2 | | |
| 13 | 14.616 | 5.90 | | | | | | |
| 14 | 25.759 | 9.25 | 1.59522 | 67.74 | L7 | 25.6 | | |
| 15 | -32.654 | 1.41 | | | | | | |
| 16 | INF | 20.00 | 1.58913 | 61.14 | Pz | — | — | — |
| 17 | INF | 6.00 | | | | | | |
| 18 | INF | 1.10 | 1.51823 | 58.90 | CG | — | — | — |
| 19 | INF | 3.95 | | | | | | |
| 20 | INF | | | | | | | |

Table 9 lists a lens interval when a projection distance is 303 mm. Numerical values related to Conditional Expressions (1) to (9) described above are listed in Table 10.

TABLE 10

| Conditional Expression | | Numerical Value |
|---|---|---|
| | fw | -532.0 |
| (1) | \|f/fw\| | 6.0E-02 |
| (2) | 1/\|fw\| | 1.9E-03 |
| | Tw | 8.69 |
| (3) | Tw/\|fw\| | 1.6E-02 |
| | Rw | -13.789 |
| (4) | \|Rw/fw\| | 2.6E-02 |
| | FX | -205.7 |
| | FY | 25.8 |
| (5) | \|FX/FY\| | 7.97 |
| | FF | -216.49 |
| (6) | 1/\|FF\| | 4.6E-03 |
| | FR | 20.41 |
| (7) | \|FF/FR\| | 10.61 |
| | OAL | 61.0 |
| | F | 31.8 |

TABLE 10-continued

| Conditional Expression | | Numerical Value |
|---|---|---|
| (8) | OAL/f | 1.9 |
| (9) | LPα | 93 |

Sixth Numerical Value Example

FIG. 12 is a view illustrating the optical arrangement of the projection optical system 104 according to a sixth example. The projection optical system 104 is formed of the lenses L1 to L6 from a magnification side (left side in FIG. 12) in order. The aperture stop 30 is disposed between the lenses L2 and L3, and the prism Pz is disposed on a reduction side of the lens L6. The light modulation element is arranged at the S18 on a reduction side (right side in FIG. 12). The cover glass (CG) of the light modulation element is arranged on a surface facing the lens.

When putting a focus, the projection optical system 104 according to the sixth example can adjust a focus by simultaneously moving the whole lens system L1 to L6 as a unit.

The lenses L1 and L2 are arranged on a magnification side with respect to the aperture stop 30, and the total refractive power of the lenses L1 and L2 is negative. From the most magnification side in order, the projection optical system 104 is formed of the positive lens L1 having a convex surface on the magnification side and the biconcave negative lens L2.

The lenses L3 to L6 are arranged on a reduction side with respect to the aperture stop 30, and the total refractive power of the lenses L3 to L6 is positive. From the most magnification side in order, the projection optical system 104 is formed of the negative meniscus lens L3 having a concave surface on the magnification side and a convex surface on a reduction side, the biconvex positive lens L4, the negative meniscus lens L5 having a convex surface on the magnification side, and the biconvex positive lens L6.

A lens having the weakest refractive power in the whole lens system is the lens L3 having a concave surface on a magnification side and a convex surface on a reduction side. The lens L2 having the strongest refractive power in the whole lens system is arranged on the magnification side of the lens L3. The total refractive power of the lens L1 to the L3 having the weakest refractive power is negative, and the total refractive power of the L4 to L6 is positive.

All of the lenses L1 to L6 have a spherical surface, and are formed of a lens single body and have no cemented lens.

FIG. 13 illustrates an aberration view: spherical aberration, astigmatic aberration, and distortion aberration of the projection optical system according to the sixth example. Each aberration correction exhibits a favorable condition.

Table 11 lists each numerical value of the sixth example.

TABLE 11

| f = 31.9 mm, Fno = 2.2, ω = 11.1° | | | | | | | |
|---|---|---|---|---|---|---|---|
| S | R | D | Nd | vd | L | F | fG |
| 1 | −27.482 | 6.40 | 1.65160 | 58.55 | L1 | 37.1 | −60.3 FX |
| 2 | −193.77 | 9.19 | | | | | −75.5 |
| 3 | −22.6 | 0.90 | 1.59270 | 35.31 | L2 | −15.0 | |
| 4 | 15.091 | 0.87 | | | | | |
| 5 | INF | 1.57 | | | | | |
| 6 | −14.806 | 9.10 | 1.80400 | 46.58 | L3 | −3155.9 | 19.1 |
| 7 | −18.99 | 0.30 | | | | | |

TABLE 11-continued

| f = 31.9 mm, Fno = 2.2, ω = 11.1° | | | | | | | |
|---|---|---|---|---|---|---|---|
| S | R | D | Nd | vd | L | F | fG |
| 8 | 31 | 3.76 | 1.48749 | 70.24 | L4 | 35.0 | FY |
| 9 | −36.878 | 9.46 | | | | | 24.2 |
| 10 | 26.731 | 1.94 | 1.76182 | 26.52 | L5 | −76.7 | |
| 11 | 17.847 | 0.44 | | | | | |
| 12 | 20.43 | 6.62 | 1.49700 | 81.55 | L6 | 29.4 | |
| 13 | −46.369 | 1.48 | | | | | |
| 14 | INF | 20.00 | 1.58913 | 61.14 | Pz | — | — — |
| 15 | INF | 6.00 | | | | | |
| 16 | INF | 1.10 | 1.51823 | 58.90 | CG | — | — — |
| 17 | INF | 3.95 | | | | | |
| 18 | INF | | | | | | |

Table 11 lists a lens interval when a projection distance is 303 mm. Numerical values related to Conditional Expressions (1) to (9) described above are listed in Table 12.

TABLE 12

| Conditional Expression | | Numerical Value |
|---|---|---|
| | fw | −3155.9 |
| (1) | |f/fw| | 1.0E−02 |
| (2) | 1/|fw| | 3.2E−04 |
| | Tw | 9.10 |
| (3) | Tw/|fw| | 2.9E−03 |
| | Rw | −14.806 |
| (4) | |Rw/fw| | 4.7E−03 |
| | FX | −75.5 |
| | FY | 24.2 |
| (5) | |FX/FY| | 3.12 |
| | FF | −60.3 |
| (6) | 1/|FF| | 1.7E−02 |
| | FR | 19.1 |
| (7) | |FF/FR| | 3.2 |
| | OAL | 50.6 |
| | F | 31.9 |
| (8) | OAL/f | 1.6 |
| (9) | LPα | 81 |

Seventh Numerical Value Example

FIG. 14 is a view illustrating the optical arrangement of the projection optical system 104 according to a seventh example. The projection optical system 104 is formed of the lenses L1 to L6 from a magnification side (left side in FIG. 14) in order. The aperture stop 30 is disposed between the lenses L1 and L2, and the prism Pz is disposed on a reduction side of the lens L6. The light modulation element is arranged at the S18 on a reduction side (right side in FIG. 14). The cover glass CG of the light modulation element is arranged on a surface facing the lens.

When putting a focus, the projection optical system 104 according to the seventh example can adjust a focus by simultaneously moving the whole lens system L1 to L6 as a unit.

The lens L1 having positive refractive power is arranged on a magnification side with respect to the aperture stop 30. The lens L1 is a positive lens having biconvex surfaces on a magnification side.

The lenses L2 to L6 are arranged on a reduction side with respect to the aperture stop 30, and the total refractive power of the lenses L2 to L6 is positive. From the most magnification side in order, the projection optical system 104 is formed of the biconcave negative lens L2, the negative meniscus lens L3 having a concave surface on the magnification side, the biconvex positive lens L4, the negative meniscus lens L5 having a convex surface on the magnification side, and the biconvex positive lens L6.

A lens having the weakest refractive power in the whole lens system is the lens L3 having a concave surface on a magnification side and a convex surface on a reduction side. The lens L2 having the strongest refractive power in the whole lens system is arranged on the magnification side of the lens L3. The total refractive power of the lens L1 to the lens L3 having the weakest refractive power is negative, and the total refractive power of the lenses L4 to L6 is positive.

All of the lenses L1 to L6 have a spherical surface, and are formed of a lens single body and have no cemented lens.

FIG. 15 illustrates an aberration view: spherical aberration, astigmatic aberration, and distortion aberration of the projection optical system 104 according to the seventh example. Each aberration correction exhibits a favorable condition.

Table 13 lists each numerical value of the seventh example.

TABLE 13

| \multicolumn{8}{|c|}{f = 32.8 mm, Fno = 2.2, ω = 11.1°} |
|---|---|---|---|---|---|---|---|
| S | R | D | Nd | vd | L | F | fG |
| 1 | 39.321 | 10.00 | 1.67003 | 47.23 | L1 | 46.5 | 46.5 FX |
| 2 | −140.8 | 10.01 | | | | | −61.8 |
| 3 | 1E+18 | 0.80 | | | | | |
| 4 | −20.186 | 0.90 | 1.59270 | 35.31 | L2 | −15.2 | 22.9 |
| 5 | 16.805 | 2.33 | | | | | |
| 6 | −17.189 | 8.88 | 1.80400 | 46.58 | L3 | 484.3 | |
| 7 | −20.28 | 0.41 | | | | | |
| 8 | 33.526 | 5.56 | 1.49700 | 81.55 | L4 | 32.8 | FY |
| 9 | −30.349 | 5.46 | | | | | 25.6 |
| 10 | 25.048 | 3.87 | 1.80518 | 25.43 | L5 | −81.9 | |
| 11 | 16.965 | 5.03 | | | | | |
| 12 | 25.663 | 10.00 | 1.49700 | 81.55 | L6 | 31.0 | |
| 13 | −34.04 | 1.48 | | | | | |
| 14 | INF | 20.00 | 1.58913 | 61.14 | Pz | — | — — |
| 15 | INF | 6.00 | | | | | |
| 16 | INF | 1.10 | 1.51823 | 58.90 | CG | — | — — |
| 17 | INF | 3.95 | | | | | |
| 18 | INF | | | | | | |

Table 13 lists a lens interval when a projection distance is 303 mm. Numerical values related to Conditional Expressions (1) to (9) described above are listed in Table 14.

TABLE 14

| | Conditional Expression | Numerical Value |
|---|---|---|
| | fw | 484.3 |
| (1) | \|f/fw\| | 6.8E−02 |
| (2) | 1/\|fw\| | 2.1E−03 |
| | Tw | 8.88 |
| (3) | Tw/\|fw\| | 1.8E−02 |
| | Rw | −17.189 |
| (4) | \|Rw/fw\| | 3.5E−02 |
| | FX | −61.8 |
| | FY | 25.6 |
| (5) | \|FX/FY\| | 2.42 |
| | FF | 46.5 |
| (6) | 1/\|FF\| | 2.1E−02 |
| | FR | 22.92 |
| (7) | \|FF/FR\| | 2.0 |
| | OAL | 63.3 |
| | F | 32.8 |
| (8) | OAL/f | 1.9 |
| (9) | FPα | 80 |

Eighth Numerical Value Example

FIG. 16 is a view illustrating the optical arrangement of the projection optical system 104 according to an eighth example. The projection optical system 104 is formed of the lenses L1 to L7 from a magnification side (left side in FIG. 16) in order. The aperture stop 30 is disposed between the lenses L4 and L5, and the prism Pz is disposed on a reduction side of the lens L7. The light modulation element is arranged at the S20 on a reduction side (right side in FIG. 16). The cover glass CG of the light modulation element is arranged on a surface facing the lens.

When putting a focus, the projection optical system 104 according to the eighth example can adjust a focus by simultaneously moving the whole lens system L1 to L7 as a unit.

The lenses L1 to L4 are arranged on a magnification side with respect to the aperture stop 30, and the total refractive power of the lenses L1 to L4 is negative. From the most magnification side in order, the projection optical system 104 is formed of the positive meniscus lens L1 having a concave surface on the magnification side, the positive meniscus lens L2 having a convex surface on the magnification side, the biconcave negative lens L3, and the negative meniscus lens L4 having a concave surface on the magnification side and having weak refractive power.

The lenses L5 to L7 are arranged on a reduction side with respect to the aperture stop 30, and the total refractive power of the lenses L5 to L7 is positive. From the most magnification side in order, the projection optical system 104 is formed of the biconvex positive lens L5, the negative meniscus lens L6 having a convex surface on the magnification side, and the biconvex positive lens L7.

A lens having the weakest refractive power in the whole lens system is the lens L4 having a concave surface on a magnification side and a convex surface on a reduction side. The lens L3 having the strongest refractive power in the whole lens system is arranged on the magnification side of the lens L4. The total refractive power of the lens L1 to the lens L4 having the weakest refractive power is negative, and the total refractive power of the lenses L5 to L7 is positive.

All of the lenses L1 to L7 have a spherical surface, and are formed of a lens single body and have no cemented lens.

FIG. 17 illustrates an aberration view: spherical aberration, astigmatic aberration, and distortion aberration of the projection optical system 104 according to the eighth example. Each aberration correction exhibits a favorable condition.

Table 15 lists each numerical value of the eighth example.

TABLE 15

| \multicolumn{8}{|c|}{f = 30.6 mm, Fno = 2.2, ω = 11.0°} |
|---|---|---|---|---|---|---|---|
| S | R | D | Nd | vd | L | F | fG |
| 1 | −47.538 | 2.38 | 1.51633 | 64.14 | L1 | 121.9 | −99.0 FX |
| 2 | −27.623 | 0.30 | | | | | −99.0 |
| 3 | 20.35 | 4.79 | 1.71700 | 47.93 | L2 | 25.6 | |
| 4 | −183 | 0.85 | | | | | |
| 5 | −46.369 | 3.80 | 1.57501 | 41.51 | L3 | −14.4 | |
| 6 | 10.518 | 4.40 | | | | | |
| 7 | −11.419 | 8.38 | 1.80610 | 40.93 | L4 | −125.0 | |
| 8 | −17.099 | 0.30 | | | | | |
| 9 | INF | 0.30 | | | | | |
| 10 | 24.688 | 6.16 | 1.49700 | 81.55 | L5 | 31.7 | 26.3 FY |
| 11 | −40.37 | 4.55 | | | | | 26.3 |
| 12 | 38.55 | 3.40 | 1.71736 | 29.52 | L6 | −40.9 | |
| 13 | 16.161 | 0.65 | | | | | |
| 14 | 20.43 | 7.58 | 1.49700 | 81.55 | L7 | 28.7 | |
| 15 | −42.04 | 1.47 | | | | | |
| 16 | INF | 20.00 | 1.58913 | 61.14 | Pz | — | — — |
| 17 | INF | 6.00 | | | | | |
| 18 | INF | 1.10 | 1.51823 | 58.90 | CG | — | — — |

TABLE 15-continued f = 30.6 mm, Fno = 2.2, ω = 11.0°

| S | R | D | Nd | vd | L | F | fG |
|---|---|---|---|---|---|---|---|
| 19 | INF | 3.95 | | | | | |
| 20 | INF | | | | | | |

Table 15 lists a lens interval when a projection distance is 303 mm. Numerical values related to Conditional Expressions (1) to (9) described above are listed in Table 16.

TABLE 16

| Conditional Expression | | Numerical Value |
|---|---|---|
| | fw | −125.0 |
| (1) | |f/fw| | 2.45E−01 |
| (2) | 1/|fw| | 8.0E−03 |
| | Tw | 8.38 |
| (3) | Tw/|fw| | 6.7E−02 |
| | Rw | −11.419 |
| (4) | |Rw/fw| | 9.1E−02 |
| | FX | −99.0 |
| | FY | 26.3 |
| (5) | |FX/FY| | 3.76 |
| | FF | −99.04 |
| (6) | 1/|FF| | 1.0E−02 |
| | FR | 26.34 |
| (7) | |FF/FR| | 3.76 |
| | OAL | 47.9 |
| | F | 30.63 |
| (8) | OAL/f | 1.56 |
| (9) | LPα | 93 |

Ninth Numerical Value Example

FIG. 18 is a view illustrating the optical arrangement of the projection optical system 104 according to a ninth example. The projection optical system 104 is formed of the lenses L1 to L6 from a magnification side (left side in FIG. 18) in order. The aperture stop 30 is disposed between the lenses L3 and L4, and the prism Pz is disposed on a reduction side of the lens L6. The light modulation element is arranged at the S18 on a reduction side (right side in FIG. 18). The cover glass CG of the light modulation element is arranged on a surface facing the lens.

When putting a focus, the projection optical system 104 according to the ninth example can adjust a focus by simultaneously moving the whole lens system L1 to L6 as a unit.

The lenses L1 to L3 are arranged on a magnification side with respect to the aperture stop 30, and the total refractive power of the lenses L1 to L3 is negative. From the most magnification side in order, the projection optical system 104 is formed of the biconvex positive lens L1, the biconcave negative lens L2, and the negative meniscus lens L3 having a concave surface on the magnification side and having weak refractive power.

The lenses L4 to L6 are arranged on a reduction side with respect to the aperture stop 30, and the total refractive power of the lenses L4 to L6 is positive. From the most magnification side in order, the projection optical system 104 is formed of the biconvex positive lens L4, the negative meniscus lens L5 having a convex surface on the magnification side, and the biconvex positive lens L6.

A lens having the weakest refractive power in the whole lens system is the lens L3 having a concave surface on a magnification side and a convex surface on a reduction side. The lens L2 having the strongest refractive power in the whole lens system is arranged on a magnification side of the lens L3. The total refractive power of the lens L1 to the lens L3 having the weakest refractive power is negative, and the total refractive power of the lenses L4 to L6 is positive.

All of the lenses L1 to L6 have a spherical surface, and are formed of a lens single body and have no cemented lens.

FIG. 19 illustrates an aberration view: spherical aberration, astigmatic aberration, and distortion aberration of the projection optical system according to the ninth example. Each aberration correction exhibits a favorable condition.

Table 17 lists each numerical value of the ninth example.

TABLE 17 f = 31.3 mm, Fno = 2.2, ω = 11.1°

| S | R | D | Nd | vd | L | F | fG |
|---|---|---|---|---|---|---|---|
| 1 | 26.78 | 9.13 | 1.69700 | 48.52 | L1 | 24.8 | −62.0 FX |
| 2 | −42.95 | 1.08 | | | | | −62.0 |
| 3 | −30.95 | 3.38 | 1.57501 | 41.51 | L2 | −14.0 | |
| 4 | 11.46 | 4.17 | | | | | |
| 5 | −11.816 | 7.86 | 1.80610 | 40.93 | L3 | −154.0 | |
| 6 | −16.94 | 0.30 | | | | | |
| 7 | INF | 0.30 | | | | | |
| 8 | 24.019 | 3.80 | 1.49700 | 81.55 | L4 | 33.5 | 26.7 FY |
| 9 | −52.402 | 8.46 | | | | | 26.7 |
| 10 | 30.349 | 4.75 | 1.71736 | 29.52 | L5 | −41.3 | |
| 11 | 14.095 | 1.43 | | | | | |
| 12 | 16.708 | 10.74 | 1.49700 | 81.55 | L6 | 24.8 | |
| 13 | −37.443 | 1.47 | | | | | |
| 14 | INF | 20.00 | 1.58913 | 61.14 | Pz | — | — |
| 15 | INF | 6.00 | | | | | |
| 16 | INF | 1.10 | 1.51823 | 58.90 | CG | — | — |
| 17 | INF | 3.95 | | | | | |
| 18 | INF | | | | | | |

Table 17 lists a lens interval when a projection distance is 303 mm. Numerical values related to Conditional Expressions described above are listed in Table 18.

TABLE 18

| Conditional Expression | | Numerical Value |
|---|---|---|
| | fw | −154.0 |
| (1) | |f/fw| | 2.03E−01 |
| (2) | 1/|fw| | 6.5E−03 |
| | Tw | 7.86 |
| (3) | Tw/|fw| | 5.1E−02 |
| | Rw | −11.816 |
| (4) | |Rw/fw| | 7.7E−02 |
| | FX | −62.0 |
| | FY | 26.7 |
| (5) | |FX/FY| | 2.32 |
| | FF | −62.0 |
| (6) | 1/|FF| | 1.6E−02 |
| | FR | 26.69 |
| (7) | |FF/FR| | 2.32 |
| | OAL | 55.4 |
| | F | 31.3 |
| (8) | OAL/f | 1.77 |
| (9) | LPα | 83 |

As described above, in the specific configuration described in the first to the ninth numerical value examples, the projection optical system 104 according to the present invention sufficiently corrects spherical aberration, astigmatic aberration, field curvature, and chromatic aberration, and sufficiently corrects distortion aberration within −2.0%. It is clear from each of the examples that the projection optical system 104 can secure favorable optical performance.

In the examples described above, materials of a lens forming the magnification side lens group G1 and a lens forming the reduction side lens group G2 are all of glass materials, and have a spherical shape.

However, only the "lens having the weakest refractive power" may be an aspherical lens; it is considered that distortion caused by a temperature change has, even when a lens having an aspherical shape is used, little influence on optical performance of the lens because of lens's characteristics of having weak refractive power.

The above-described embodiment is illustrative and does not limit the present invention. Thus, numerous additional modifications and variations are possible in light of the above teachings. For example, at least one element of different illustrative and exemplary embodiment herein may be combined with each other or substituted for each other within the scope of this disclosure and appended claims. Further, features of components of the embodiment, such as the number, the position, and the shape are not limited the embodiment and thus may be preferably set. It is therefore to be understood that within the scope of the appended claims, the disclosure of the present invention may be practiced otherwise than as specifically described herein.

REFERENCE SIGNS LIST

100 Image projection device
101 Lighting optical system
102 Light source
103 Relay optical system
104 Projection optical system
105 Screen
201 Image display element
202 Light quantity detecting element

CITATION LIST

Patent Literature

PTL 1: Japanese Patent No. 5199148
PTL 2: Japanese Patent No. 5210196
PTL 3: Japanese Laid-open Patent Publication No. 2011-170309
PTL 4: Japanese Laid-open Patent Publication No. 2010-249946
PTL 5: Japanese Patent No. 2714687
PTL 6: Japanese Laid-open Patent Publication No. 2014-021309

The invention claimed is:

1. A projection optical system for an image projection device, the projection optical system comprising:
a plurality of lenses,
wherein the projection optical system satisfies conditional expression (1):

$$0.01 \leq \left|\frac{f}{f_w}\right| < 0.34 \tag{1}$$

where fw is a focal length of a lens having a weakest refractive power in the lenses, and f is a focal length of the projection optical system as a whole, and
the lens having the weakest refractive power has a concave shape on a magnification side and a convex shape on a reduction side.

2. The projection optical system according to claim 1, wherein each of the lenses is a single lens.

3. The projection optical system according to claim 1, wherein
the projection optical system further comprises:
a magnification side lens group arranged on the magnification side with respect to the lens having the weakest refractive power; and
a reduction side lens group arranged on the reduction side with respect to the lens having the weakest refractive power,
a total refractive power of the magnification side lens group and the lens having the weakest refractive power is negative, and
a total refractive power of the reduction side lens group is positive.

4. The projection optical system according to claim 3, wherein
the projection optical system satisfies conditional expression (5):

$$2.0 < \left|\frac{FX}{FY}\right| < 8.5 \tag{5}$$

where FX is a composite focal length between the magnification side lens group and the lens having the weakest refractive power, and FY is a focal length of the reduction side lens group.

5. The projection optical system according to claim 1, wherein
all materials of a lens forming the magnification side lens group and a lens forming the reduction side lens group are glass materials, and have a spherical shape.

6. The projection optical system according to claim 1, wherein the projection optical system satisfies conditional expression (2):

$$\frac{1}{|f_w|} < 1.3 \times 10^{-2} \tag{2}$$

where fw is the focal length of the lens having the weakest refractive power.

7. The projection optical system according to claim 1, wherein the projection optical system satisfies conditional expression (3):

$$\frac{T_w}{|f_w|} < 8.0 \times 10^{-2} \tag{3}$$

where fw is the focal length of the lens having the weakest refractive power and Tw is a lens thickness of the lens.

8. The projection optical system according to claim 1, wherein the projection optical system satisfies conditional expression (4):

$$\left|\frac{R_w}{f_w}\right| < 1.6 \times 10^{-1} \tag{4}$$

where fw is the focal length of the lens having the weakest refractive power and Rw is a curvature radius of the lens on a magnification side.

9. The projection optical system according to claim 1, wherein a negative lens having a strongest refractive power in the plurality of lenses is arranged on a magnification side of the lens having the weakest refractive power.

10. The projection optical system according to claim 1, wherein the projection optical system satisfies conditional expression (8):

$$1.0 < \frac{OAL}{f} < 3.0 \tag{8}$$

where OAL is a distance from a surface on the magnification side of the lens that is disposed on the most magnification side to a surface on the reduction side of the lens that is disposed on the most reduction side out of the optical members forming the projection optical system excluding an optical member having no refractive power and f is a focal length of the whole lens system.

11. The projection optical system according to claim 1, wherein the projection optical system satisfies conditional expression (9):

$$LP\alpha < 100 \tag{9}$$

where $LP\alpha(\times 10^{-7}/°C.)$ is a linear expansion coefficient of the lens on the most magnification side at 100° C. to 300° C.

12. The projection optical system according to claim 1, wherein the whole projection optical system is extended in an optical axis direction so as to adjust a focus.

13. An image projection device, comprising:
the projection optical system according to claim 1;
a light source;
an image display element; and
a lighting optical system to uniformly irradiate the image display element with a light ray from the light source.

14. A projection optical system for an image projection device, the projection optical system comprising a plurality of lenses, wherein
each of the lenses is a single lens,
a lens group on a magnification side than of a fixed aperture stop has a positive or negative refractive power,
a lens group on a reduction side of the fixed aperture stop has a positive refractive power,
any one of the lens groups on a magnification side and on a reduction side of the fixed aperture stop includes a lens having the weakest refractive power in the lenses, and
the lens having the weakest refractive power has a concave shape on the magnification side and a convex shape on the reduction side.

15. The projection optical system according to claim 14, wherein
the projection optical system satisfies conditional expression (6):

$$\frac{1}{FF} < 2.5 \times 10^{-2} \tag{6}$$

where FF is a focal length of a lens group on the magnification side with respect to the fixed aperture stop.

16. The projection optical system according to claim 14, wherein the projection optical system satisfies conditional expression (7):

$$1.5 < \left|\frac{FF}{FR}\right| < 21.0 \tag{7}$$

where FF is a focal length of a lens group on the magnification side with respect to the fixed aperture stop and FR is a focal length of a lens group on the reduction side with respect to the fixed aperture stop.

17. A projection optical system for an image projection device, the projection optical system comprising:
a plurality of lenses,
wherein the projection optical system satisfies conditional expression (1):

$$0.01 \leq \left|\frac{f}{f_w}\right| < 0.34 \tag{1}$$

where fw is a focal length of a lens having a weakest refractive power in the lenses, and f is a focal length of the projection optical system as a whole,
wherein a negative lens having a strongest refractive power in the plurality of lenses is arranged on a magnification side of the lens having the weakest refractive power.

* * * * *